(12) United States Patent
Holmberg et al.

(10) Patent No.: US 12,081,357 B2
(45) Date of Patent: Sep. 3, 2024

(54) ULTRA-LOW LATENCY ATOMIC MULTICAST

(71) Applicant: Telefonaktiebolaget LM Ericsson (publ), Stockholm (SE)

(72) Inventors: Per Holmberg, Stockholm (SE); Leif Johansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 17/753,880

(22) PCT Filed: Sep. 19, 2019

(86) PCT No.: PCT/SE2019/050887
§ 371 (c)(1),
(2) Date: Mar. 17, 2022

(87) PCT Pub. No.: WO2021/054875
PCT Pub. Date: Mar. 25, 2021

(65) Prior Publication Data
US 2022/0360465 A1 Nov. 10, 2022

(51) Int. Cl.
*H04L 12/18* (2006.01)
(52) U.S. Cl.
CPC ...... *H04L 12/1881* (2013.01); *H04L 12/1868* (2013.01)
(58) Field of Classification Search
CPC .......................... H04L 12/1881; H04L 12/1868
See application file for complete search history.

(56) References Cited

U.S. PATENT DOCUMENTS

| 5,742,812 | A | * | 4/1998 | Baylor | H04L 9/40 |
| | | | | | 707/999.008 |
| 5,748,736 | A | * | 5/1998 | Mittra | H04L 63/126 |
| | | | | | 713/163 |
| 6,026,448 | A | * | 2/2000 | Goldrian | G06F 9/544 |
| | | | | | 709/200 |
| 6,959,323 | B1 | * | 10/2005 | Tzeng | H04L 47/34 |
| | | | | | 709/205 |

(Continued)

FOREIGN PATENT DOCUMENTS

| WO | 2019035092 A1 | 2/2019 |
| WO | 2019/108098 A1 | 6/2019 |
| WO | 2020/060450 A1 | 3/2020 |

OTHER PUBLICATIONS

International Preliminary Report on Patentability, PCT App. No. PCT/SE2019/050887, Mar. 31, 2022, 9 pages.

(Continued)

*Primary Examiner* — Abdullahi E Salad
(74) *Attorney, Agent, or Firm* — Nicholson De Vos Webster & Elliott LLP

(57) ABSTRACT

A method is implemented by a computing device for atomic multicast support for a multicast group, includes receiving a message order from a sequencer via remote write, the message order defining a sequence for a plurality of messages from a multicast group, receiving the plurality of messages from at least one sender in the multicast group via remote write, and providing the plurality of messages to an application in the message order, in response to determining that all of the plurality of messages have been received.

18 Claims, 23 Drawing Sheets

PROCESS OF RECEIVERS

(56) References Cited

U.S. PATENT DOCUMENTS

| | | | |
|---|---|---|---|
| 10,659,328 B2* | 5/2020 | Sundaram | G06F 16/1744 |
| 2002/0032602 A1* | 3/2002 | Lanzillo, Jr. | G06Q 30/06 |
| | | | 705/14.66 |
| 2002/0083203 A1 | 6/2002 | Lim | |
| 2008/0031245 A1* | 2/2008 | Pekonen | H04W 72/30 |
| | | | 370/312 |
| 2011/0145533 A1 | 6/2011 | Raisch et al. | |
| 2015/0071155 A1 | 3/2015 | Miyamoto et al. | |
| 2015/0207855 A1* | 7/2015 | Hanckel | H04L 41/069 |
| | | | 709/201 |
| 2015/0242324 A1* | 8/2015 | Novakovic | G06F 12/0813 |
| | | | 711/121 |
| 2016/0205662 A1* | 7/2016 | Cormier | H04L 12/1881 |
| | | | 370/312 |
| 2016/0352604 A1* | 12/2016 | Valencia Lopez | ............... |
| | | | H04L 67/1097 |
| 2019/0028420 A1* | 1/2019 | Chen | H04L 51/216 |
| 2020/0204527 A1* | 6/2020 | Vass | H04L 63/0428 |

OTHER PUBLICATIONS

International Search Report and Written Opinion for Application No. PCT/SE2019/050887, dated Mar. 17, 2020, 11 pages.

Sagar Jha et al., "Derecho: Fast State Machine Replication for Cloud Services," Jan. 2019, 50 pages, ACM Trans. Comput. Syst., vol. 1, No. 1, Article 1.

Hor Kuz, "COMP9243—Week 3a (08s1)," 2009, 11 pages, The University of New South Wales School of Computer Science & Engineering.

* cited by examiner

PROCESS OF RECEIVERS

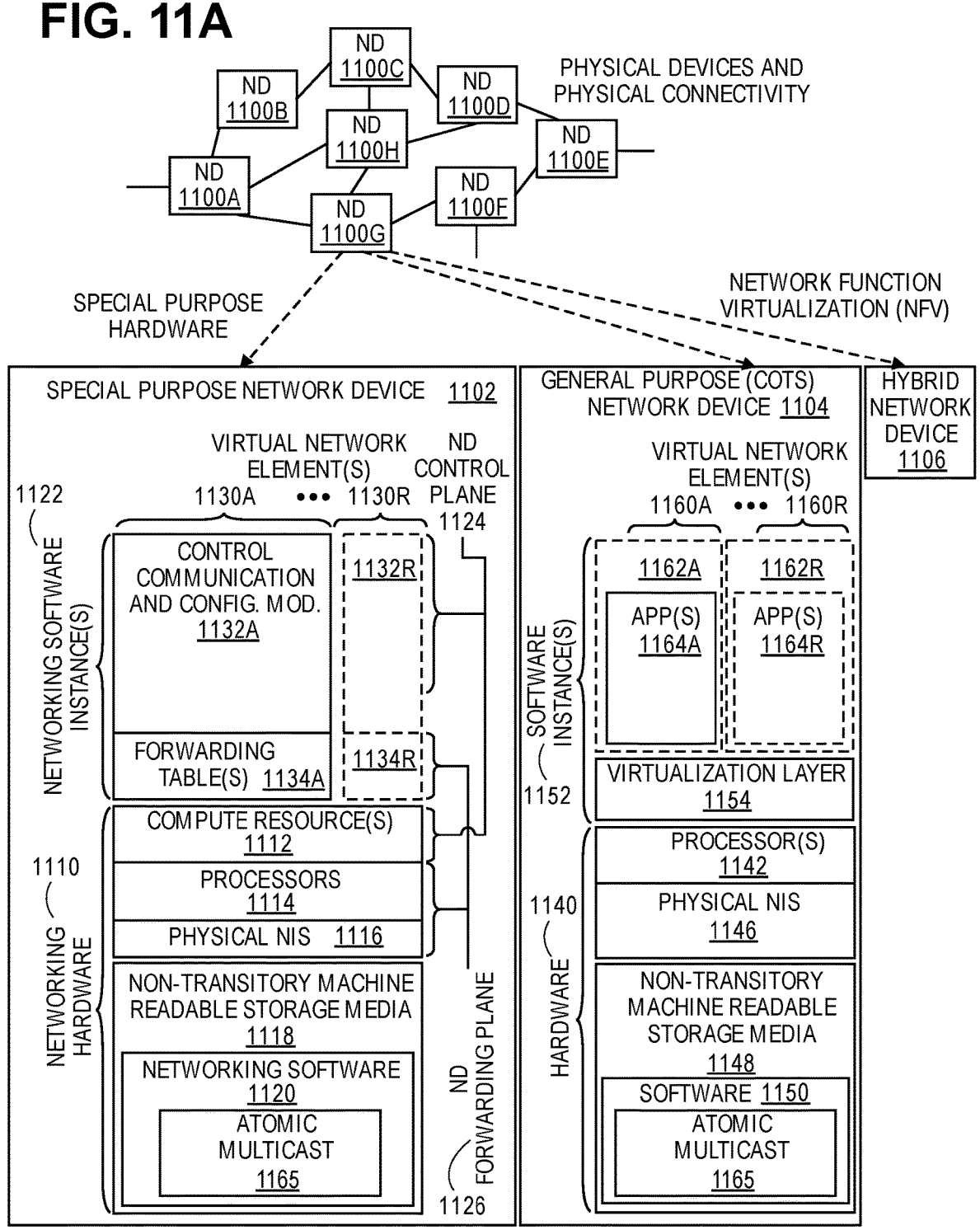

US 12,081,357 B2

ULTRA-LOW LATENCY ATOMIC MULTICAST

CROSS-REFERENCE TO RELATED APPLICATIONS

This application is a National stage of International Application No. PCT/SE2019/050887, filed Sep. 19, 2019, which is hereby incorporated by reference.

TECHNICAL FIELD

Embodiments of the invention relate to the field of multicasting in a network; and more specifically, to the use of remote writes to implement an atomic multicast to a group of network devices.

BACKGROUND ART

Computer networks have many forms of communication between the nodes found therein. These forms of communication can include, point-to-point, point-to-multipoint and similar forms of communication. Point-to-point (P2P) communication involves the transmission of messages over a network between two nodes. P2P communication can involve any number of intermediate nodes with each end-point node able to be a sender and a receiver. Point-to-multipoint (P2MP) communication involves communication between one node and multiple nodes, in a one-to-many relationship, along multiple paths between the single node and the multiple nodes. Communication in point-to-point and point-to-multipoint can be bi-directional or unidirectional.

Multicasting and broadcasting are types of P2MP communication. Broadcasting refers to transmitting messages that will be received by every node in the network. Broadcasting represents a one-to-all relationship between the sending node and all other nodes in the network. In some cases, the scope of the broadcast can be limited to a broadcast domain. Broadcasting a message results in all nodes in the broadcast domain receiving the message including the sending node. Multicasting is typically a transmission of messages from a sender to a specific group of nodes in a network. This group of nodes can be defined prior to the sending of the message or as part of sending the message, e.g., where the message specifies the participants of the group.

Broadcasting and multicasting are a common form of network communication but are also resource and bandwidth intensive in the sense that a large number of messages are promulgated between the nodes. There are many types of networking protocols that support broadcasting and/or multicast. Broadcasting is often utilized in local area networks (LANs) using Ethernet. In larger networks, multicast protocols are often utilized to widely disseminate messages to a large group of nodes. Multicasting protocols limit the pool of receivers to those that join a specific multicast receiver group.

SUMMARY

In one embodiment, a method is implemented by a computing device for atomic multicast support for a multicast group, includes receiving a message order from a sequencer via remote write, the message order defining a sequence for a plurality of messages from a multicast group, receiving the plurality of messages from at least one sender in the multicast group via remote write, and providing the plurality of messages to an application in the message order, in response to determining that all of the plurality of messages have been received.

In another embodiment, an electronic device includes a non-transitory computer readable medium having stored therein code for atomic multicast, and a processor coupled to the non-transitory computer readable medium, the processor to execute the code for atomic multicast to carry out the method steps. In further embodiments, the electronic device is configured to execute a plurality of virtual machines, the plurality of virtual machines implementing network function virtualization (NFV). In other embodiments, the electronic device is a control plane device configured to implement a control plane of a software defined networking (SDN).

In one embodiment, a machine-readable medium comprises computer program code which when executed by a computer carries out the method for atomic multicast.

BRIEF DESCRIPTION OF THE DRAWINGS

The invention may best be understood by referring to the following description and accompanying drawings that are used to illustrate embodiments of the invention. In the drawings:

FIG. 11A illustrates connectivity between network devices (NDs) within an exemplary network, as well as three exemplary implementations of the NDs, according to some embodiments of the invention.

FIG. 11B illustrates an exemplary way to implement a special-purpose network device according to some embodiments of the invention.

DETAILED DESCRIPTION

Figure 1:
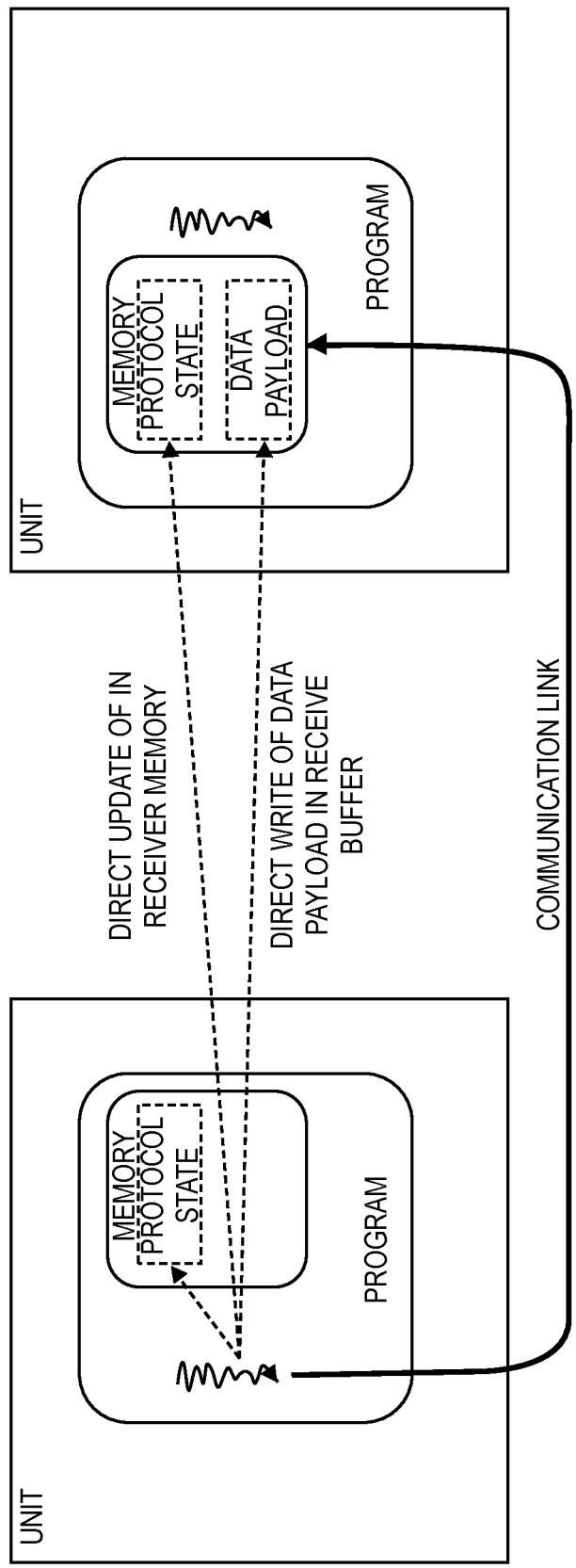
FIG. 1 is a diagram of one embodiment of two computing devices communicating via a communication link utilizing a remote write.

The following description describes methods and apparatus for implementing an atomic multicast operation over low latency links using remote writer operations. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments provide a low-latency implementation for an "atomic multicast" operation. An atomic multicast, also referred to as "total ordered multicast," is a distribution of a message over a communication network to the member nodes. The atomic multicast operation ensures that each participating node in a multicast group receives the same set of messages in the same order. The multicast is considered "atomic," because the atomic multicast either eventually completes correctly at all participants, or all participants abort without side effects. Atomic multicasts are an important distributed computing primitive. The group of nodes that receive atomic multicast messages can be determined prior to an atomic multicast operation, e.g., where participants in the group 'join' or similarly request to become members of the group, the group is defined by an administrator, or similar group definition mechanism. In other embodiments, a group of recipients is defined at the time the atomic multicast operation is performed, e.g., by the sending nodes providing a list of recipient nodes. While the example of a pre-defined group is primarily utilized herein, the embodiments are not limited to pre-defined groups and a group can refer to a set of nodes that are specified at the time the atomic multicast operation is performed.

An atomic multicast operation can be utilized in a number of computing settings including in cloud-based applications or other distributed systems. A cloud-based application or distributed system can replicate specific data or services to a set of processing units. This data or set of services can be replicated to the set of processing units to achieve higher throughput, lower latency, scalability, redundancy or similar benefits. Throughput can be improved by load sharing on many processing units to meet a load demand. Latency can be lowered by this distribution by maintaining a local replicate (i.e., copy) of data or a service local to applications or systems that utilize them. Scalability is improved through improved power management that increases or decreases depending on load at a given processing unit. Redundancy improves fault tolerance for applications and systems and is based on replication of data for availability in multiple devices and locations such that a failure of a specific device or network components will not result in failure of an operation.

In cloud computing applications and distributed computing, maintaining copies (i.e., replicates) of data or services improves the operational characteristics and product value of these applications and services. The embodiments provide an atomic multicast process and system that enables an order of magnitude lower latency and a similar overall higher performance than any known atomic multicast implementation, making it possible to implement scalability in applications and systems where it was not possible before. These improvements can be applicable in cellular communication networks for improving scalability near the radio area networks and base stations.

As used herein, the term "atomic multicast" refers to an atomic multicast to a group of processes. The group of processes can be open (i.e., the members of the group can change over time) or closed (i.e., the members are fixed or limited). Atomic multicast is a key building stone for any scalable system and is a key primitive in any cluster computing framework or cloud computing system. An atomic multicast is also an important function when implementing scalable communication services.

The embodiments utilize remote write operations for two computing devices, or processing units, and communicate by performing an update of data directly into the memory of another processing unit. The remote write can be implemented using direct memory writing technologies based on peripheral component interconnect express (PCIe), or remote direct memory access (RDMA), over Ethernet or InfiniBand, and similar technologies. In some embodiments, a remote write process can be utilized for implementing an ultra-fast communication between processing units (e.g., within a radio base station) by providing storage mechanisms that allow memory mapping directly into the receiving program of a memory space in another processing unit. This type of remote write communication enables communication from one application thread to another application thread, bypassing hypervisor and operating system functions, without the overhead of a networking stack. In the embodiments, a 'remote write' is an operation to write or store data (e.g., via a write or store instruction) to a location that is within a virtual address space of the application performing the remote write. The remote write can be executed by a processor of the processing unit implementing the sending application. The location where the data is written is memory mapped to a location in an address space of another application that is receiving the data (e.g., in a receive buffer of the receiving application). The receiving application is executing in a separate processing unit, thus, the write of data to the receiving application is a 'remote' write.

FIG. 1 is a diagram of one example embodiment of a remote write operation between two processing units. The processing units 101A and 101B can be any type of computing device or component with processing capabilities and non-transitory computer readable storage media. The processing units 101A and 101B can be in communication via any type of communication link 103. The communication link 103 can be a bus, interconnect, network connection (e.g., Ethernet or Token Ring), or similar communication link or combinations thereof. In one example embodiment, the communication link can be a part of a mesh or switched network topology where PCIe or Ethernet are the interconnect technologies.

The processing units 101A and 101B utilize remote write operations to communicate over the communication link 103. For example, the processing units 101A and 101 can perform remote writes using PCIe or RDMA to write data directly to the memory of the other processing unit without the use of a higher-level network protocol. Each processing unit 101A and 101B reserves dedicated memory space on a per-processing unit or per-application basis where data can be written and where remote write related protocol state information can be stored. This direct remote write operation is utilized to support the embodiments of the atomic multicast.

The embodiments also describe a low overhead method for aggregating communication responses from multiple applications, or processing units, by using direct remote writes. A participant in a multicast group that supports atomic multicast reserves, or similarly, establishes a dedicated memory area for receiving communication status information. A sender of a message that is part of the atomic multicast utilizes the reserved memory area at the receiver to remote write messages including data and header information. Each receiver of the messages that are a part of an atomic multicast also utilize remote writes to acknowledge, update protocol related information, and provide similar information related to the receipt of messages. An application or processing unit can be both a sender and a receiver for a given group that supports atomic multicast. Allocating these reserved memory areas, local to an application or processing unit, makes it possible to leverage hardware and/or software prefetch functions to efficiently iterate over a data structure with the received messages for an atomic multicast to properly manage the messages according to the requirements of an atomic multicast.

Figure 2:
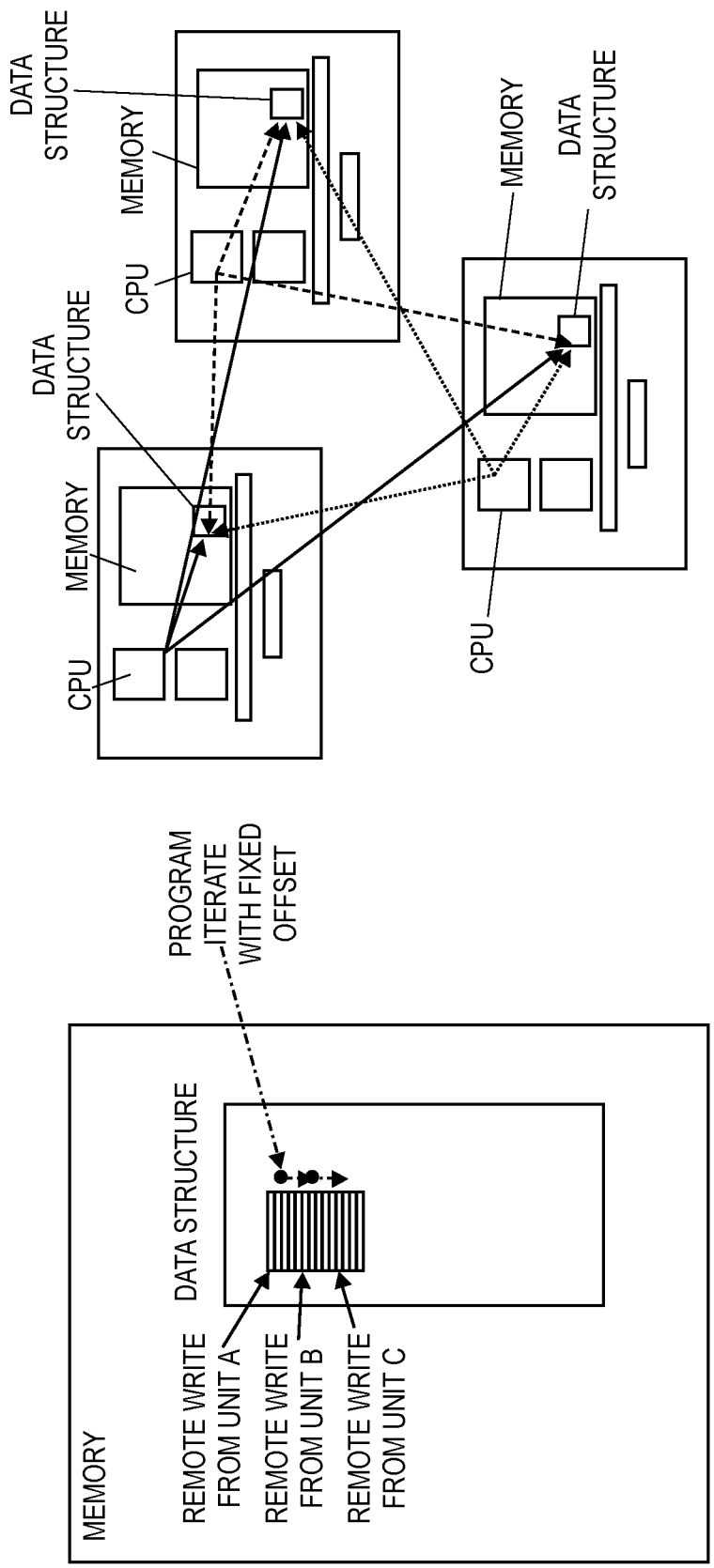
FIG. 2 is a diagram of one embodiment of a computing device aggregating response messages in a single data structure.

FIG. 2 is a diagram illustrating a data structure in a reserved memory area for aggregating messages from multiple senders of a group that support atomic multicast. As shown, each of the separate processing units A-C include separate processing and memory resources. Each processing unit reserves a portion of the memory for communication with the group. Messages for the group are written directly by the respective senders into the reserved memory. The messages can be organized as a data structure. In the illustrated example, a reserved memory area includes a data structure with spaces specifically reserved for each sender (i.e., spaces for remote writes from units A-C).

Figure 3:
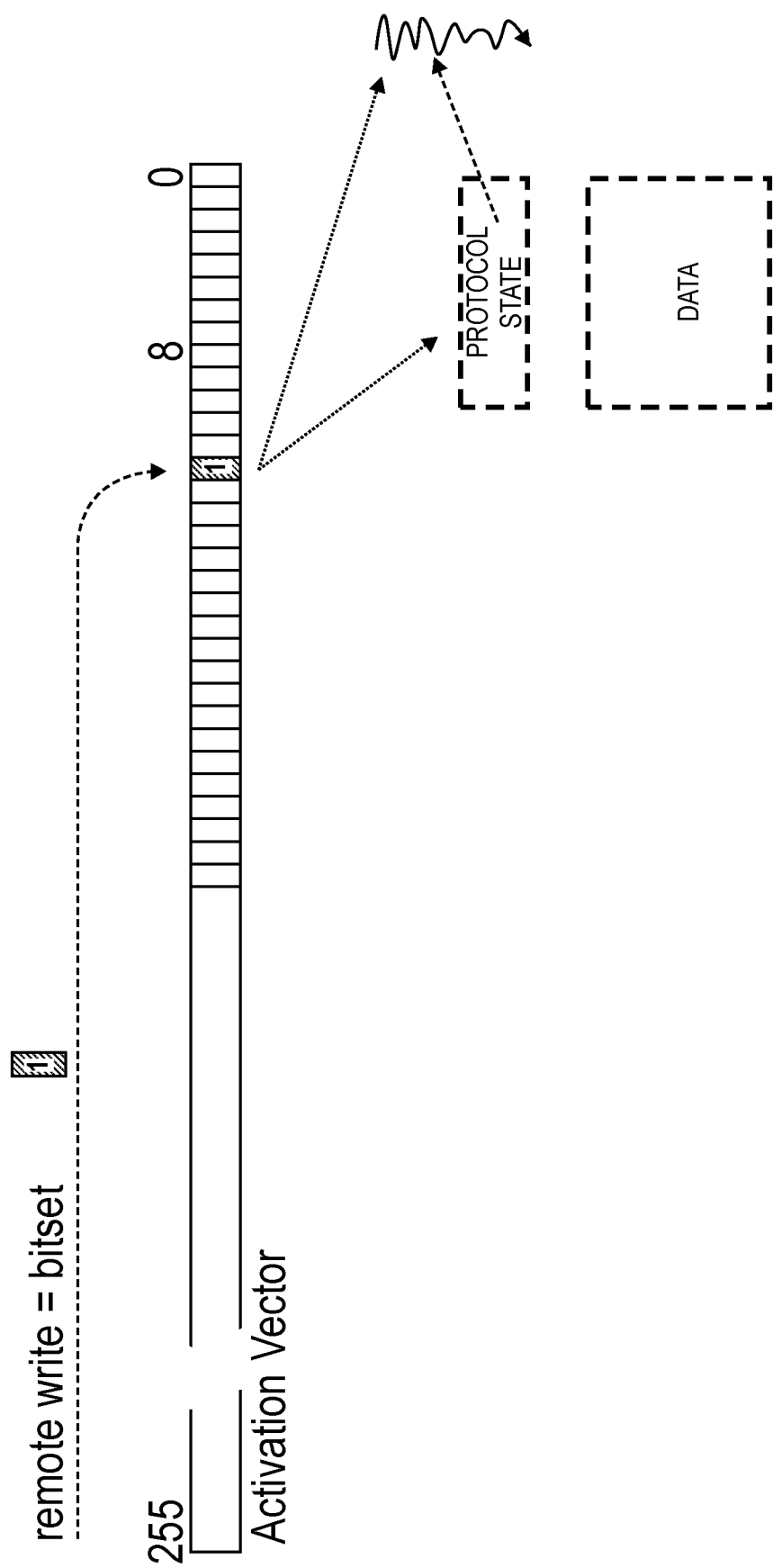
FIG. 3 is a diagram of one embodiment of an activation vector to facilitate a remote write.

FIG. 3 is a diagram of an activation vector that can be utilized in some embodiments with remote writes. In addition to the data structure described with relation to FIG. 2, an "activation vector" can be another data structure that is utilized for managing messages and communications between members of a group. An activation vector can be maintained for each processing unit or each receiving program or application at the processing unit. The activation vector stores the data utilized by each receiver for polling all senders of all groups that the receiver is a participant in. Thus, a receiver can poll a single location, i.e., the activation vector to determine whether there are incoming messages to be processed. The activation vector includes a single, cache line wide, memory area. A sender performs a write to the shared activation vector data structure, giving a hint about subsequent communications to be done. The receiver can then do a single memory read of the shared activation vector data structure to poll all senders (i.e., determine whether any sender is expected to be writing messages into the reserved memory area). The receiver can further use the activation vector information to start prioritizing communication, to prefetch routines for the indicated communication, to prefetch communication state data, and similarly prepare for the expected communication. This can then be done in parallel with data transfers (i.e., the remote write operations) and significantly decrease the latency and overhead for the whole communication process. Without the use of an activation vector or similar tracking mechanism, the receivers must continuously monitor the reserved memory area for new data provided by remote write, which is more resource intensive than monitoring the activation vector or similar tracking mechanism. As illustrated in FIG. 3, a detection of a change to a bit in the activation vector can be correlated to a particular sender and the protocol state can be updated and a check made for received data in the reserved memory area.

In this embodiment, the activation vector enables improved performance at the overhead cost of an extra remote write of a single data item (e.g., a single bit or byte) by the sender. This extra remote write is pipelined, with other remote writes, and the overhead cost is small compared to the gains in reduced resource usage.

In some embodiments, the atomic multicast process and system builds on the remote write, reserved memory data structure, and/or the activation vector, and any combination thereof, to provide efficient mechanism for supporting replication of data and events between processing units. The efficient replication of data and events between processing units, in turn, enables an order of magnitude of lowered latency for atomic multicast over prior implementations thereof.

The embodiments for atomic multicast provide advantages over the prior art. There are several options of implementing a totally ordered multicast and there are different advantages and disadvantages with each of them. One option is to multicast messages and then agree on their order. This option allows for distributed and parallel multicasting, however distributed agreement protocols have high overhead as they consist of multiple rounds of messages to all recipients. A second option is serializing the sending of messages by senders. Serializing by the sender means that everything is serialized. The sender waits for their turn to send, then sends the multicasting message, and waits and collects acknowledgements before any other sender can do anything. A third option is centralizing the sending of messages. This option multicasts messages from a central unit that manages the ordering of the messages and multicasts the messages received. In this option, the messages must then complete one extra transfer to the centralized unit. Centralizing in this manner can generate a high load for the interfaces on that centralized unit as well as that part of network in which it resides. Thus, each of these solutions have higher execution overhead and latency than the embodiments. Existing solutions do not meet the latency or predictability requirements for making scalable software (e.g., software utilized in radio processing at radio base stations).

The embodiments, by contrast, provide a solution that is optimized for higher efficiency and predictability under most circumstances while keeping the atomic multicast guarantees, including messages arriving to all group participants and ordering guarantees for the messages.

Figure 4:
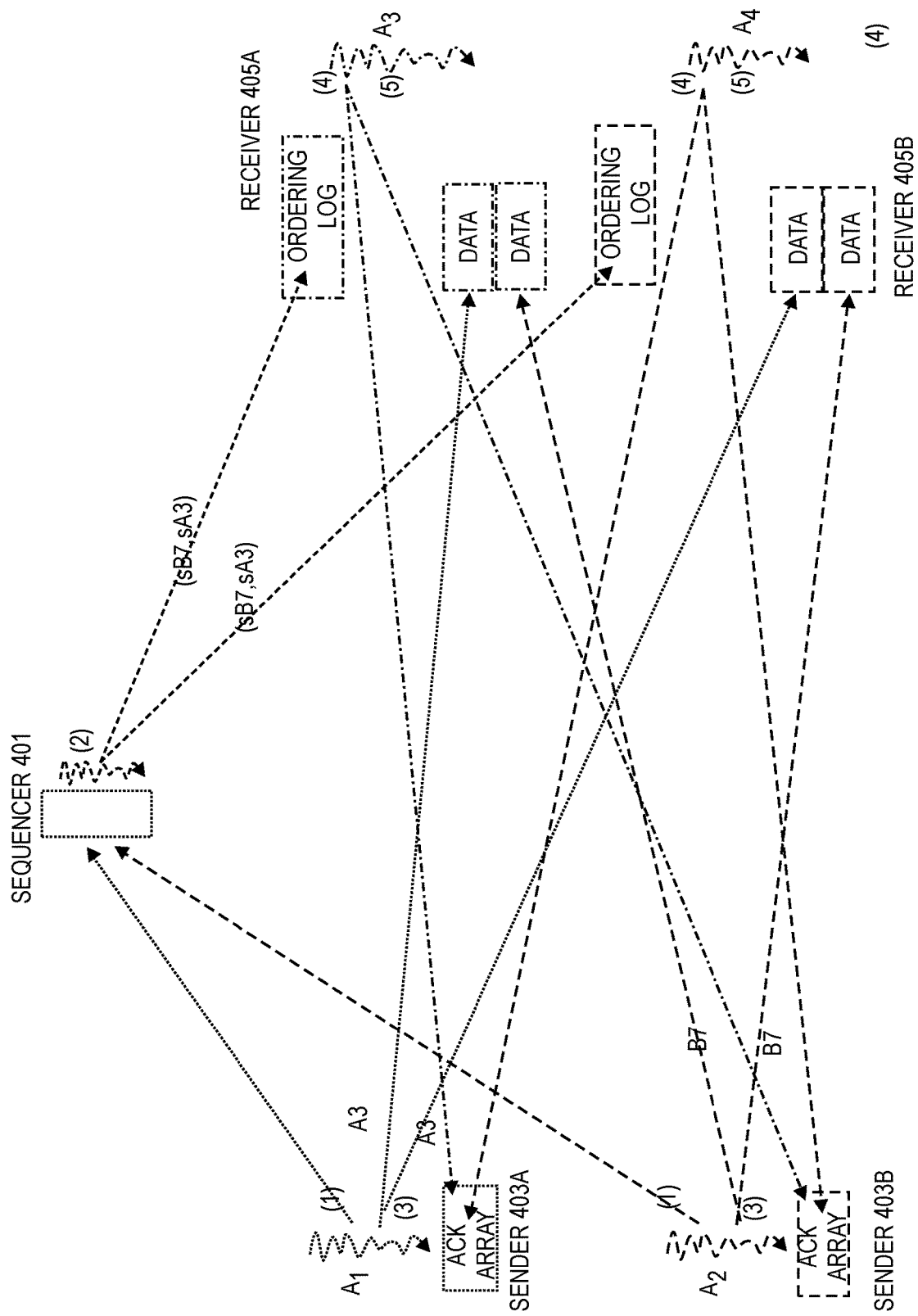
FIG. 4 is a diagram of one embodiment of a set of computing devices implementing an atomic multicast.

FIG. 4 illustrates one embodiment of an example set of computing devices implementing the atomic multicast process. The embodiments separate out the ordering guarantee of the process and centralize the management of the ordering process. There is a separate ordering request that is issued while the remaining part of the process, the message transfer and acknowledgements, are carried out between senders and receivers. The sender of messages performs ordering requests using remote writes to a sequencer implemented by a processing unit. The ordering request sets bits in a shared data structure of the sequencer. The ordering is managed by the sequencer via a dedicated thread and the data-structure that can operates as a centralized activation vector. The dedicated thread sends updates to all receivers of a group about the ordering that messages should be passed to the respective local applications for an atomic multicast. The ordering information is passed to the receivers by the sequencer performing a remote write to a message order log in a reserved memory area of the receiver.

An example atomic multicast is illustrated in FIG. 4 where a set of senders 403A and 403B request to send messages to the group including a set of receives 405A and 405B. The senders 403A and 403B can also be receivers, however, for sake of clarity and conciseness the senders 403A and 403B are not illustrated to be receivers. In the example, the atomic multicast process is initiated by the senders 403A and 403B making dedicated ordering requests (1). The dedicated ordering requests are implemented by performing a remote write that updates a centralized tracking mechanism. In one embodiment, the tracking mechanism is a centralized activation vector and the remote write sets a bit or byte in the centralized activation vector indicating that the specific sender is going to send a message as part of an atomic multicast. The implementation of the sending functions A1 and A2 at the senders 403A and 403B respectively can be in software, hardware, or any combination thereof in a processing unit.

The sequencer 401 monitors the tracking mechanism (e.g., a centralized activation vector) and in response to receiving a first dedicated ordering request start determines an ordering sequence (i.e., an update to an ordering log) to be sent to the receivers 405A and 405B. The tracking mechanism identifies each sender that has requested to send a message. The sequencer 401 processes dedicated ordering requests in the order they are received as fast as the sequencer 401 can generate updates. If multiple requests are received (from the same sender or multiple senders) by the sequencer 401 at approximately the same time and before an update has been generated, then the sequencer 401 can order the messages (2) of the senders using any process or algorithm. For example, the sequencer can set the order based on sender identifiers, order of receipt of requests, a fixed relative priority order, or similar process. The order of the messages or an updated to the order of the messages is then provided (4) to all participants in the group (e.g., receivers 405A and 405B) by utilizing remote writes to write the order of the messages into an ordering log specific to the group at each receiver. The order of the messages can be stored in any format or data structure that identifies all of the messages to be received (e.g., identifying each sender that is to send a message), and the relative order of these messages. The ordering log can be stored in a reserved area of memory established by each receiver. The reserved area can be where other protocol state information is stored for atomic multicast for the group.

At the same time or subsequent to the sequencer receiving and processing dedicated ordering requests, the senders 403A and 403B each multicast (3) their respective messages to each of the receivers 405A and 405B using remote writes to the reserved memory area for the group. After the senders 403A and 403B write their messages to each of the reserved memory areas for the group in each receiver 405A and 405B, the senders wait to receive acknowledgement of the receipt and processing of their messages from each receiver. The sending functions, e.g., A1 and A2, can implement the acknowledgement monitoring operation. An acknowledgement tracking mechanism can be utilized by each sending function A1 and A2 to identify acknowledgements that are received by remote writes to these tracking structures. The acknowledgement tracking mechanism can be a separate activation vector or similar tracking structure.

Receivers 405A and 405B include receiving processes A3 and A4 respectively that monitor the ordering logs for changes. Upon detecting an update to their respective ordering logs (4), the receiving processes A3 and A4 check and continue to monitor the reserved memory space for messages. Monitoring of the ordering log can be via polling or similar mechanism. Once all of the messages identified by the ordering log are received, the receiving processes A3 and A4 pass the messages in the order specified by the ordering log to a local application associated with the group. In some embodiments, the messages are passed individually in the order specified. In other embodiments, the receiver can pass multiple messages in a batch to the local application where there are multiple new messages in an ordering log that are received in close proximity without waiting for the arrival of subsequent messages. If the messages are not all received in a predetermined or configured timeframe then the messages are discarded, and the atomic multicast fails. If all the messages are successfully received, then an acknowledgement is provided to each of the senders of messages in the ordering log. The acknowledgements can be provided by remote writes to an acknowledgement tracking structure such as an acknowledgement activation vector or acknowledgement array.

At the senders 403A and 403B the sending processes A1 and A2 monitor the acknowledgement tracking structure (e.g., an activation vector or array). If all of the acknowledgements are received, then the atomic multicast process completes. If any of the acknowledgements are not received or a negative acknowledgement is received, then the sending process can resend the message or take similar corrective action as discussed further herein below.

FIG. 4 presents a simplified example to illustrate the general operation of the embodiments of the atomic multicast. Additional details and embodiments are further described herein below. As mentioned, applications and processing units that send messages in an atomic multicast, for example A1 and A2, are often also receivers of the atomic multicast messages. The associated processing units and applications must then also follow the rules for being receivers of the atomic multicast and perform operations following the same ordering as other participants in the group to keep copies of the data of the atomic multicast coherent. That is, the processing units must also act as receivers and postpone updating their own copies of the atomic multicast data until receiving the ordering information from the sequencer.

The embodiments provide minimal latency. Ordering is done in parallel with data transfers (e.g. no or minimal extra latency for guaranteeing ordering, the extra hop is in parallel with message multicast), all operations are done with minimal latency remote write operations (e.g. the atomic multicast inherits performance advantage from this), removes the overhead of standard message protocols (e.g., assemble message, create header, and similar actions), user level implementations (e.g. all mechanisms designed to bypass OS and hypervisor etc.). The embodiments enable hard real time guarantees, provide scalable throughput, because ordering requests are minimal, only one remote write operation is needed. The embodiments provide message delivery that is scalable, where each sender delivers (i.e., multicasts) its messages independently and in parallel.

In the embodiments, only the ordering is centralized and serialized and this is minimal, all other functions are distributed and parallel. Ordering log updates (i.e., via multicast) are small and can be batched, removing bottlenecks in the atomic multicast process. In some embodiments, ordering can be resolved with minimal overhead using vector instructions. The embodiments have the advantages of the activation vector mechanism or similar tracking mechanism, e.g. these tracking mechanisms allow for power management and similar advantages. The embodiments can leverage hardware broadcast/multicast support if available in network interfaces or in a switch or a router. In the embodiments of atomic multicast, applications can get immediate fault responses when a remote write fails as standard communication links (e.g. PCIe and RDMA) have failure detection on point to point communication (e.g. for communication not leveraging hardware broadcast/multicast). This significantly simplifies the fault handling.

The embodiments of the atomic multicast process have applications within radio access network base stations, distributed systems, cloud computing systems and similar environments. In a base station, the embodiments of atomic multicast meet real time demands, because the time for coordination using the embodiments of atomic multicast is a fraction of the time required for radio transmission time interval (TTI) and roundtrip. The embodiments enable dynamic scalability, where the group for coordination can change. Deployment is independent, works for both centralized and distributed base station implementations.

In cloud systems and similar distributed computing systems, the embodiments of atomic multicast enable lower latencies and lower overhead in very wide range of cloud mechanisms, e.g., atomic multicast protocols, consensus protocols, and services that build on these like distributed lock servers, membership protocols, leader election, distributed key value stores and databases, distributed file systems. The use of remote writes is in line with future cloud systems that can be based on RDMA and similar technologies. In cloud systems and similar systems, high availability (HA) systems use groups of 2, 3, or 5 for achieving redundancy.

System View

The embodiments of atomic multicast are implemented by a system that includes a set of program instances executed by a set of processing units that implement the atomic multicast as a set of functions including sending, receiving, and sequencing functions. A 'set,' as used herein, refers to any whole number of items including one item. The program instances replicate some information between the processing units to support these functions, in a manger that provides performance scalability, high availability, and transparent hardware and/or software management.

Maintaining the replicated data by each program instance to implement atomic multicast means that the communication framework guarantees both arrival of messages and protocol information to all replicates and the ordering of the messages, even if there are exchanges of messages and protocol information from multiple sources. The program instances perform updates in the order they arrive to maintain consistency. For example, if there are disturbances in the communication and messages are lost, then the atomic multicast does retransmission in a way that that delivering guarantees are kept, messages are delivered to all participants in the atomic multicast group and in with the same ordering. References to a 'group' herein are to an atomic multicast group.

The atomic multicast process can be used to support replication of data across the processing units to service applications local to each processing unit. For example, state machine replication can be implemented using atomic multicast where there is a distributed process and the state machine and its data needs to be replicated to each participating processing unit. If multiple processing units distribute different messages where ordering is critical, for example setting a bit in a data structure to zero or to one, then the atomic multicast process guarantees that these arrive in the same order to each program instance, keeping the replicated copies updated in a consistent way.

The data structures used for atomic multicast are set up at group formation start or at group reformation when adding or removing members. Thus, each participant in the group sets of the reserved memory areas and data structures to support the atomic multicast when the participate joins the group. Each group has a sequencer that manages ordering. In some embodiments, a sequencer is elected by a process or algorithm within the group. In other embodiments, a user or administrator configures the location of the sequencer. The sequencer can be a separate program executed by one of the process units that is separate from the sending and receiving functions.

Data Structures

Data structures are allocated in reserved memory location and initiated when group atomic multicast communication is set up, for example, at group formation or group reformation. Each program instance at each processing unit sets up a data structures to receive messages, e.g., a reserved memory receive buffer for atomic multicast messages for each potential sender and a single data structure for receiving updates to the ordering log from the sequencer. Each sender may also set up a data structure for aggregating acknowledgements. Similarly, the sequencer sets up data structures including a shared data structure to function as a tracking mechanism, e.g. a vector for collecting ordering requests from each potential sender.

The operations in the flow diagrams will be described with reference to the exemplary embodiments of the other figures. However, the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
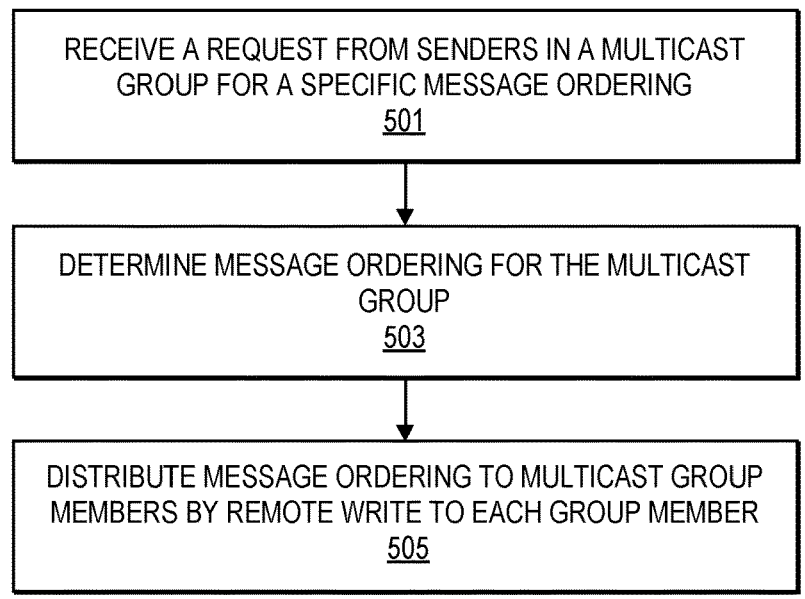
FIG. 5 is a flowchart of one embodiment of a process for a sequencer implementing atomic multicast.

FIG. 5 is a diagram of one embodiment of a process of a sequencer to implement atomic multicasts. The sequencer receives ordering requests from any sender in the group that is seeking to send a message as part of an atomic multicast (Block 501). Each program instance that is sending performs a remote write to a tracking structure managed by the sequencer. In one embodiment, to enable multiple outstanding messages from the sender and for detecting faults, the sender writes rolling sequence information. This rolling sequence information can be encoded in different ways, for example as a sequence number or as a mask. The ordering request is written to the shared tracking mechanism data structure. In one embodiment, the tracking mechanism is implemented as an activation vector for the sequencer.

Using an activation vector as the tracking mechanism provides an efficient way of collecting requests from multiple senders, scanning for changes, and prioritizing to set ordering.

Figure 8:
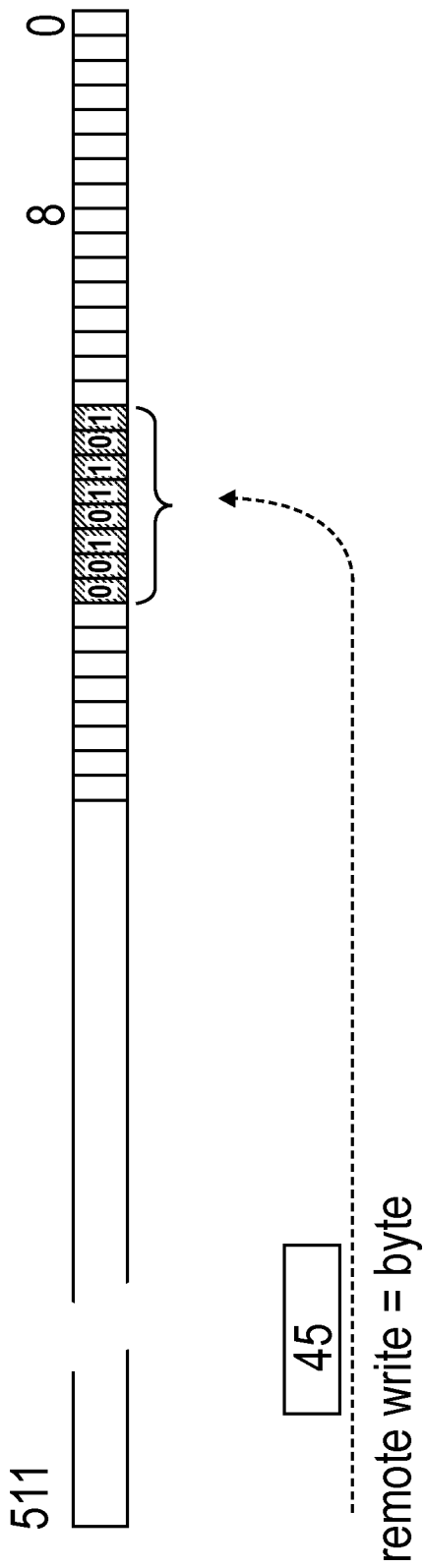
FIG. 8 is a diagram of one embodiment of a sequence information writing process for a sender as part of an atomic multicast.

FIG. 8 is a diagram of an example implementation of the tracking structure for a sequencer. In this example implementation, the sequence information written to the tracking structure is small. For example, the sequence information can be an 8-bit byte, making room for 64 senders to the group within a 64-byte cache-line. The message sequence information can be encoded as a counter. A byte of information would then allow for up to 255 outstanding messages, if no bits are used for encoding any other information. The remote write must then be atomic to ensure coherency. In another embodiments, the sequence information is encoded as an 8-bit bitfield, setting a bit in one end for indicating a new message and clearing a bit in the other end when acknowledged. This embodiment would then allow for 7 outstanding messages.

The embodiments of the tracking structure of the sequencer can be optimized in various manners. In some embodiments, multiple groups can share a sequencer thread. If there are few members in a group (like 3 for keeping redundancy) then it can be possible to map multiple groups into one vector.

There are various embodiments for implementing communication with the sequencer. In one embodiment, the tracking mechanism is an activation vector with one field for each program instance (i.e., each participate in the group). If program instance participates in multiple groups, then there is a subfield within for each group. This method can be the fastest way but allows for limited sender and group combinations. In another embodiments, a communication channel is utilized. A sender then performs two remote writes to the sequencer, first a write to an activation vector setting bits indicating the communication channel and then a write appending a request. The request then indicates which group and the senders sequence number.

Returning to FIG. 5, in response to detecting a change in the tracking mechanism at the sequencer the sequencer can start to determine the ordering of the messages (Block 503). In some embodiments, the sequencer utilizes a dedicated thread to monitor or supervise the tracking structure and reacts to updates, either by hardware supervision or by polling for changes. In response to detecting an update, the sequencer scans the tracking mechanism and identifies changes by comparing with previous versions of the tracking structure, and then using a scan for locating the first non-zero item (i.e., the first changed position in the tracking mechanism). The position indicates then which sender has a message to send. For example, there can be a check if the sequence number for from the sender is the expected sequence number. If so, then this ordering request should be added to an ordering log to be disseminated. The sequencer then continues scanning the tracking mechanism to find any further new requests and, if so, appends them to the ordering log in the same way. In some embodiments, after the scan of the tracking structure completes the generated ordering log is multicast via remote writes to the receivers for that group (Block 505). In some embodiments, the scan can be allowed to continue for a preconfigured duration to enable configuration of the time frame and frequency for determining which multicast messages are included in a given atomic multicast.

Figure 9:
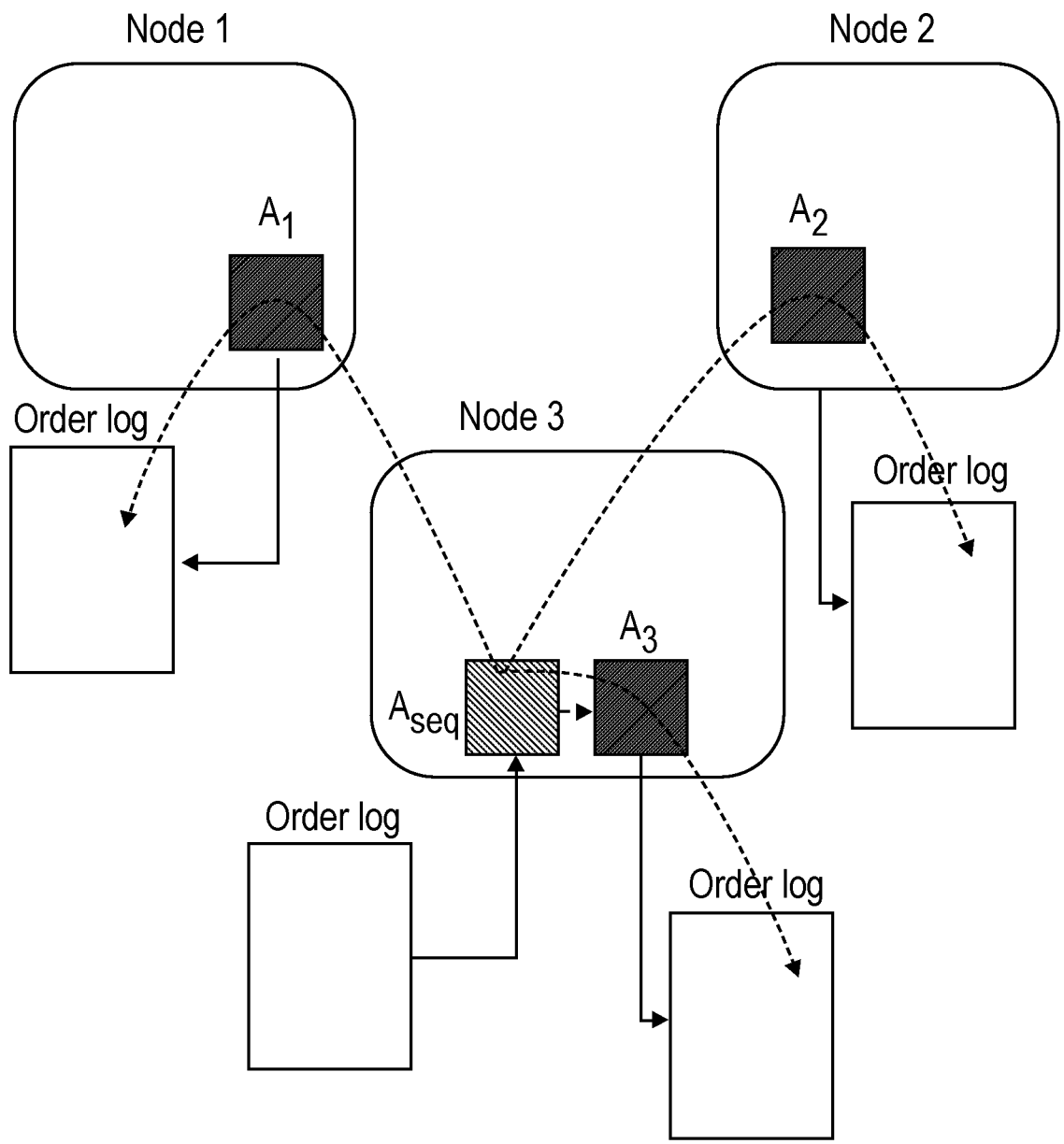
FIG. 9 is a diagram of one embodiment of the operation of a sequencer to coordinate group members ordering logs using remote writes.

FIG. 9 is a diagram of one example embodiment of a dissemination of an ordering log. In the example, node 3 is functioning as the sequencer with a determined sequence Aseq generated by the sequencer, which is written to each node 1-3 into a location reserved for the ordering log at each node. The updates to the ordering log can for example have the format of a tuple indicating sender and sequence number. Alternatively, instead of indicating sender, the ordering log can directly indicate the input data area of the receive buffer where the message will be found, by using an index to the buffer, an offset into the buffer memory area, or by an absolute address in the buffer. There are several possible implementations, but the configuration setup of the communication buffer ensures that all receivers have the same information.

The advantage with a centralized sequencer is the low overhead and low latency. However, the centralized sequencer manages the sequencing every message for the group. Thus, the sequencer influences scalability and latency for the embodiments. The embodiments can be paired with several optimizations to minimize limitations of the centralized sequencer. The data format of the sequence information allows for using vector instruction, e.g. extracting updates using vector XOR instruction and then locating/prioritizing using instruction finding first bit set using a scan instruction e.g. bsf (bit scan forward), ffs (find first bit set), clz (count leading zeroes) and similar vector instructions. The ordering log data is minimal, it can indicate the input buffer where each receiver should pick the next message. Coalescing (merging) of order log updates is possible. If there are many dedicated ordering requests at the same time, then the sequencer can set the ordering and multicast using larger remote writes that update multiple entries. A sender can increase efficiency by pipelining multicasts, e.g. by performing multiple remote write requests and then pushing to the interconnect using one synchronization command. The pipelining can vary depending on implementation. For example, a PCIe interconnect with a x86 processor would pipeline by writing to a target address from the write combining buffer (the store buffer) by an sfence instruction. In another example, a RDMA interface would pipeline by processing multiple updates into a buffer and then issuing a single DMA transfer. The atomic multicast process can leverage a hardware multicast if the underlying interconnect supports it. PCIe and RDMA over Ethernet define dual cast or multicast, but these versions are unreliable.

Additional embodiments for improving can include the sender supervising the update of its own ordering log as an acknowledge for the ordering request. The transfers for this embodiment are small, and the update would be almost immediate. If the sender doesn't see an update, then it can repeat the request. The sequencer can be configured to accept a single message gap, e.g. if it sees requests from a sender of message 2 then 3 then 5, it can safely assume that the request for message 4 was corrupted and add both 4 and 5 to the ordering log. Remote writes to the ordering log can be fixed size and bigger than a log entry, e.g. updating the same information multiple times. This will then provide forward redundancy at high load.

Figure 6:
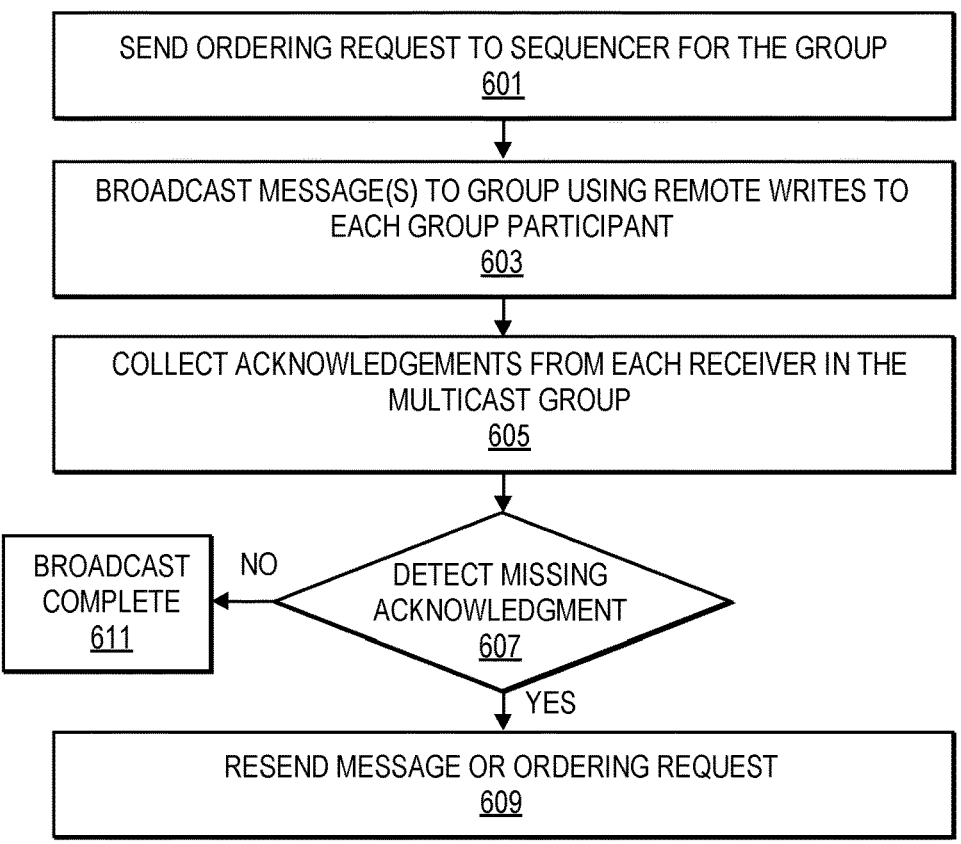
FIG. 6 is a flowchart of one embodiment of a process for a sender to multicast a message to a group as part of an atomic multicast.

FIG. 6 is a flowchart of one embodiment of a process of a sender. As mentioned in regard to the operation of the sequencer, the process can begin with the sender generating and sending an ordering request to a sequencer for the group (Block 601). The ordering request can involve a remote write to the tracking mechanism of the sequencer.

The sender can then multicast a message to each participant in a group by doing remote writes into the designated data buffers in each receiver (Block 603). This can be either before, after or in parallel with the sending the ordering request. The multicast can be done in parallel with ordering request flow through the sequencer without waiting for it to be ready. The multicast can be done as long as the data can be written into the right position in each receiver's receive buffer. The receive buffer used in each receiver is specific for each sender. That is, the sender only needs to know where to write with respect to its own messages, not in respect to the global order set by the sequencer.

After doing multicast, the sender can start waiting for acknowledges (Block 605). The message data transferred by the senders are likely much larger than the ordering information. For this reason, it is important that each sender can perform multicast independently and in parallel without any ordering requirements. A sender must check that a sent message is acknowledged. Since the messages sent by a sender were multicast to several receiver, then the sender must verify that all receivers have acknowledged receipt of each message. The acknowledgements are received by the receivers using remote writes into dedicated positions in the memory of the sender. The positions are selected for making it possible to iterate by reading on fixed offsets in the memory.

The sender can also be participating as a receiver for the atomic multicast and thereby also receives ordering information into its ordering log and also passes the messages to the local application in accordance to ordering. That is, it also 'receives' the message and can 'acknowledge' in the same manner by writing into its own memory.

Figure 10:
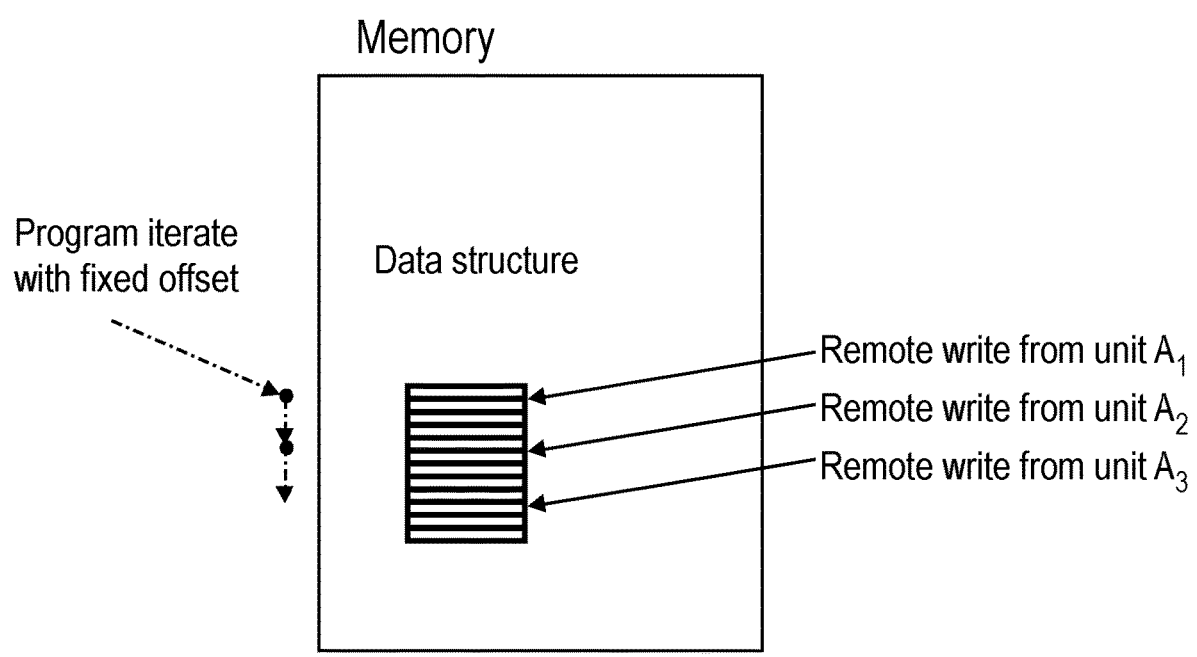
FIG. 10 is a diagram of one embodiment of an acknowledgement data structure.

FIG. 10 is a diagram of one embodiment of a memory area reserved for storing a data structure for acknowledgments. The data structure can have any format. In the illustrated example, each participant has a designated location of equal size or offset within a reserved memory location. Each participant is provided with information at the time the communication is established to enable the participant to know the corresponding location. For example, each participant can be given an offset or similar location information along with a location of the data structure, which may be in a similar location for each participant.

Returning to FIG. 6, if an acknowledge is missing in the data structure, then a sender can retransmit both the ordering request to the sequencer (forcing sequencer to resend) and then also the message to participants that has not been acknowledged (Block 609).

If an acknowledgement indicates an ordering log update was received, but not message reception, then only the message may be retransmitted. If all of the messages have been acknowledged, then the process completes (Block 611).

The operation of the sender can be optimized in various embodiments. Having a fixed offset allows for data prefetch if a data structure is large, especially hardware prefetch starts working after 2-3 entries with fixed delta. The sender can update its own data in the data structure, pretending to receive, removing the special case of skipping its own entry in the data structure.

In addition, the sender can pipeline multicast messages over multiple interfaces if available, e.g. the sender can pipeline multicasts over multiple PCIe interfaces if available. The sender can speculatively do updates of messages into receivers' data buffers. That is, forward data by remote write into a receive buffer in another unit as soon as it gets data or creates data, based on the assumption that it is likely that this will be the next message and then abort at any time if speculation fails. The data in the buffer will not be read as long as there is no ordering request for receiving it.

The sender of the message can explicitly control the ordering of individual remote writes for transferring the message. Specifically, to support efficient transfer of variable length messages, e.g., by writing the first position last. The receiver can use this for polling arrival and see that the whole message is available. The sender can include a length indicator in the data in the first position. The receiver then knows the end of message location and the start position of the next message. In some embodiments where a FIFO queue is utilized to pipeline multicast messages, an update of a tail pointer (i.e., by the receiver) can serve as an acknowledgement. Thus, for each message sent it is possible to check for acknowledges when the receiver updates the tail pointer at the sender. If no messages have been sent, then the sender can enter a power sleep mode or similarly wait until the tail pointer is updated. This part of the protocol can leverage an unreliable hardware multicast if the underlying interconnect supports it. In the same way as for hardware multicast, it is possible to organize a multicast fan-out structure, e.g. where one receiver forwards multicast messages to other receivers. This can be efficient in mesh style networks. Pipelining is also possible in the sending function.

Figure 7:
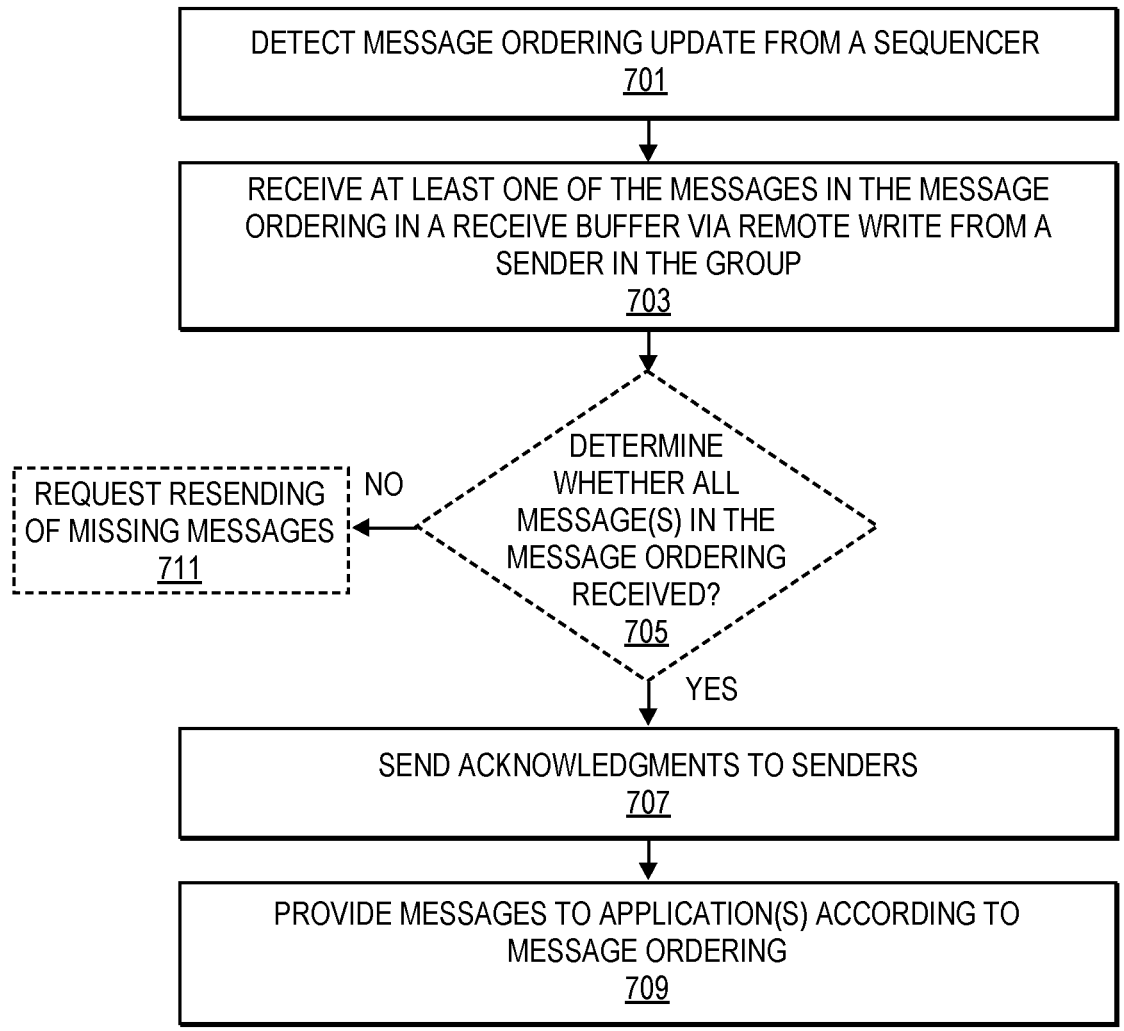
FIG. 7 is a flowchart of one embodiment of a process for a receiver to receive messages from computing devices in a group as part of an atomic multicast.

FIG. 7 is a diagram of one embodiment of a process for a receiver. The receiver polls the ordering log to detect updates received from the sequence (Block 701). This can be either be performed as an active poll, or if in a power down sleep mode, by having a hardware monitor supervising the cache line for the next entry to trigger a waking up on an update (e.g. UMWAIT in an x86 processor or WFE in an ARM architecture). The receiver starts polling the data area waiting for message arrival as indicated by the received message ordering update. In some embodiments, the polling is limited or controlled by a timer. The use of hardware monitoring and activation vectors is described herein primarily with relation to their use at the receiver. However, these structures can be utilized at the sender and sequencer where waiting for updates and messages. For example, the hardware monitor and/or activation vector can be used at the sequencer when waiting for new ordering requests.

Returning to the operation of the receiver, when the message arrives it is checked to be correct (Block 703). Each message that arrives is generally processed as it arrives as quickly as the receiver is able to process the message. In some embodiments, the receiver checks to determine whether each message identified by the message ordering are received within a pre-determined time frame or before a timer elapses (Block 705). If any message is not received, then a request or negative acknowledgment can be written to the corresponding sender acknowledgement tracking mechanism (Block 711). For each message received, the receiver can acknowledge the message receipt by writing an acknowledgement to the acknowledgment tracking mechanism of the corresponding sender.

In some embodiments, the remote write mechanism makes it possible for the sender to explicitly control the ordering of the individual updates in the data transfer to the buffer. Writing the first address last, either by writing in reverse order, or by simply delaying the write of that item, allows the poll to be in the first part of the message. By doing this, the address to poll will be independent of message length. This allows for variable message length without extra overhead. The message format will then need to have a length indicator (or a next message pointer) in a defined place in the message format. In some embodiments, if the message does not arrive within a timer period, then the receiver can instead reply back to sender with a partial Ack, indicating that there is an entry in the ordering log, but the corresponding message has not arrived as expected.

The receiver sends an acknowledge back to the sender by doing a remote write operation into its position in an acknowledge tracking mechanism in the sender. This indicate that the whole transaction is complete, i.e. that message has transferred and been ordered. In some embodiments, the acknowledgement replied to the sender can be divided into two parts, an acknowledgement for the transfer of ordering information and one acknowledgment for the message transfer. This gives the sender explicit information and can decide on an appropriate recovery action.

The acknowledgment for the ordering log can be the address or position in the ordering log. When ready, all members should have updated to the same value. The acknowledgement for the message transfer can be the end address or end position in the data area, all members should then have updated to the same value. Alternatively, the acknowledgement can involve a sequence number or a bit in a given field.

Messages are passed to a local application tied to the communication channel in the ordering set by the order log (Block 709). As soon as the message has arrived and an acknowledge has been sent, then the receiver can analyze the message and do the processing task.

In some embodiments, the receiver will be occupied during the processing and not poll the ordering log for further messages. That is, in these embodiments, either tasks need to be all short lived, or the protocol needs to be designed for handling a variable timing and have a large enough window size for the outstanding (not acknowledged) messages. In some embodiments, a zero copy is used, where the remote write allows for putting the messages directly into application memory. Longer messages or groups of messages can be broken into chains of subcomponents to give acknowledge more rapidly. Allocating a separate hardware core/thread for managing the protocol and dispatching tasks on cores allows for more variation in task length.

Multicast Fan-Out

In some embodiments, the atomic multicast can support a fan-out in the distribution of messages. One consideration when designing multicast protocols is how to perform fanout—how to not limit performance by one sender output bandwidth. On possible embodiment for mitigating this limitation is by using remote write which is a low overhead operation, that the only centralized multicast is sending ordering information, which are small and are per group. All other multicast sends can be handled by each individual sender. The sequencer can batch multiple updates into the same remote write. Hardware fan-out can also be allowed. As designed, the atomic multicast process is independent to fan-out method. Specifically, it can be combined with hardware support for fan-out if available.

The embodiments can utilize hardware multicast support in the network or interconnect interface if available, e.g. some PCIe and many RDMA interfaces allow messages to be sent to dual or multiple targets. Some switches have multicast support, e.g. a message that arrives on one port can be replicated and sent to multiple receivers on separate ports. Fan-out trees can be implemented in software, e.g. a message on one input port can be retransmitted on multiple output ports. Interconnects like PCIe or RDMA over Ethernet or InfiniBand support robustness on the link level (e.g. acknowledgements and timeouts and in some cases retransmission). However, when using hardware multicast support, there are only unsafe versions available. The embodiments for atomic multicast as described herein do not depend on link level supervision and can use unsafe multicasts.

Fault Handling

The embodiments of the atomic multicast process guarantee that, for a non-faulty system, messages arrive to all or to none and that the applications see the same message order. In some embodiments, fault handling is provided for the atomic multicast process that makes it possible to keep these guarantees in the presence of temporary disturbances in network or computing device operation by using timeouts, acknowledgements and retransmissions.

As described above, the sender of an atomic multicast supervises the transmission, collecting acknowledges from each receiver and having timeout for a maximum response time. In the case of missing responses, the sender can resend the whole transaction e.g. resend the ordering request to the sequencer and redo multicast of the message. The ordering information contains message sequencing information, making it possible for receivers to detect and disregard replicated information. The receiver updates the sender with its current status, acknowledging the latest message it received from the sender.

In some embodiments, additional optimizations to fault handling include where the sender sees that a receiver is missing only message information, but has acknowledged ordering log update, then the sender can update only that receiver, instead of multicasting to all. If the sender detects that a receiver has not acknowledged ordering information, then the sender can ask the sequencer to redo an update for that receiver only, instead of multicasting to all, if the format allows for doing such dedicated request to sequencer. If the underlying communication link has a link level protocol, then this can also provide supervision for individual "remote write" transfers. This is for example available when remote write is implemented using point to point transfers over RDMA or over PCIe, but typically not available when multicast transfers. If available, the sender can do link-level retransmission directly without waiting for an acknowledge on the atomic multicast.

Failover

If a problem occurs during an atomic multicast that can't be recovered within the process as described herein, then the system is faulty. A failover means that information is replicated for fault tolerance or high availability and that, in response to a fault, then the application can continue operating using the surviving replicas without risk of inconsistency. An atomic multicast is then said to be 'stable' at the point when the transaction (the message and corresponding ordering information) is replicated in different nodes in a way so it is not lost at a fault.

The embodiments of the atomic multicast design are optimistic and deliver messages to the application immediately, before the messages are replicated to participants and are stable. To make failover possible then a receiver that delivers an atomic multicast message to the application must also preserve a copy of the ordering information and the message until it is stable and securely replicated to the other nodes. Until that transfer is securely completed it might be the only surviving copy.

An application that receives an optimistically delivered message cannot do externally (i.e., outside the multicast group) visible actions before the ordering information and message is stable and replicated to other nodes. This rule is not needed for internal actions, e.g. doing another atomic multicast to the group on optimistically delivered messages. The ordering prevents these to be delivered to an application before there is also a local copy of the previous message. The atomic multicast process implements these guarantees by not reusing space in receive buffers before transactions are complete, i.e. acknowledged by all (surviving) receivers. Requiring an application to verify that the received multicasts are stable before doing externally visible actions ensures proper sequencing and consistency of external actions in case of faults.

A normal sequence for managing externally visible actions is that a program first replicates bookkeeping information within the group, does an external action and verify it, and finally replicates protocol status information within the group that it is done. In this case, it is the same program instance that will first send the atomic multicast and then do the check for stability before doing the externally visible action. This is simple to implement as it will be the same program collecting acknowledgements, giving minimal overhead and no need for extra signaling for verifying stability.

Thus, the embodiments of the atomic multicast process provide numerous advantages that are derived from unique aspects including that a sender posts a separate ordering request to a centralized sequencer by a remote write into a shared data structure in the sequencer memory. The message is multicast directly to each receiver by a remote write. The centralized sequencer detects a write to the centralized data structure and performs ordering and then, using remote write, update of an ordering log in each receiver. Receivers of the atomic multicast wait for both ordering information and message before acknowledging the transaction as a whole back to the sender. Several additional unique aspects can be included in various embodiments as optimizations including if the ordering request makes two steps, the sequencer fills in the missing step in the ordering log (e.g. forward redundancy). Remote writes to the ordering log that writes the new entry and that also rewrites at least one old entry. This gives a forward redundancy in case of transient faults on the interconnect. An acknowledge from receiver back to sender of an atomic multicast that carries two information items, separately acknowledge ordering request and separately acknowledge message. For example, encoded in two separate fields. This enables faster fault detection and handling as well as improved debug capabilities. Message updated with length/checksum written last, making it possible to poll message after getting ordering log update. The process can fill in no-op messages if sender is dead or not connected to retransmit.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated-circuits (ASICs) and a special-purpose operating system (OS); and 2) a general-purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A). The networking software 1120 can include atomic multicast 1165 support as described herein. In other embodiments, the atomic multicast 1165 functions are implemented in other components of the network device 1102 as a program instance and/or as distributed functions.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general-purpose network device 1104 includes hardware 1140 comprising a set of one or more processor(s) 1142 (which are often COTS processors) and physical NIs 1146, as well as non-transitory machine-readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R. The software 1148 can include atomic multicast 1165 support as described herein. In other embodiments, the atomic multicast 1165 functions are implemented in other components of the network device 1104 as a program instance and/or as distributed functions.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 11C:
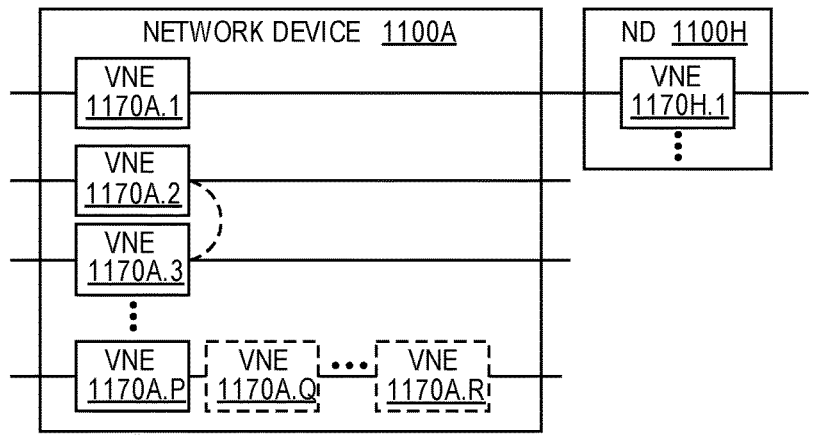
FIG. 11C illustrates various exemplary ways in which virtual network elements (VNEs) may be coupled according to some embodiments of the invention.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 11D:
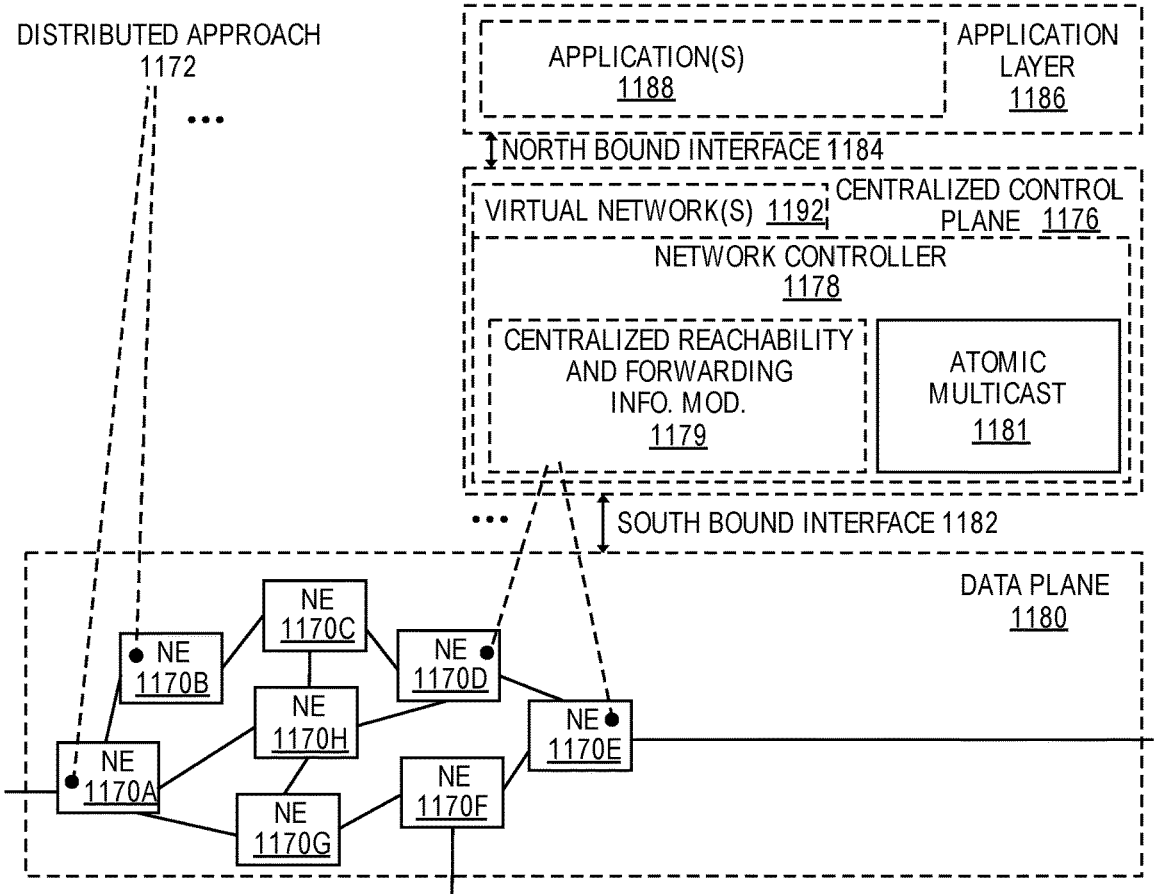
FIG. 11D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 11D illustrates a network with a single network element on each of the NDs of FIG. 11A, and within this straight forward approach contrasts a traditional distributed approach (commonly used by traditional routers) with a centralized approach for maintaining reachability and forwarding information (also called network control), according to some embodiments of the invention. Specifically, FIG. 11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general-purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs. The network controller 1178 can include atomic multicast 1181 support as described herein. In other embodiments, the atomic multicast 1181 functions are implemented in other components of the controller as a program instance and/or as distributed functions.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general-purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R, VNEs 1160A-R, those in the hybrid network device 1106). Alternatively or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

Figure 11E:
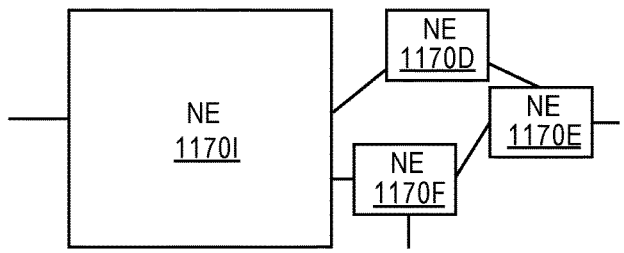
FIG. 11E illustrates the simple case of where each of the NDs implements a single NE, but a centralized control plane has abstracted multiple of the NEs in different NDs into (to represent) a single NE in one of the virtual network(s), according to some embodiments of the invention.
Figure 11F:
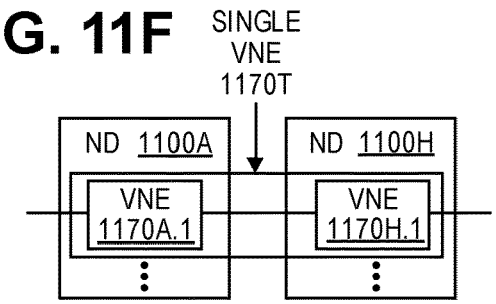
FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 11701 in one of the virtual network(s) 1192 of FIG. 11D, according to some embodiments of the invention. FIG. 11E shows that in this virtual network, the NE 11701 is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
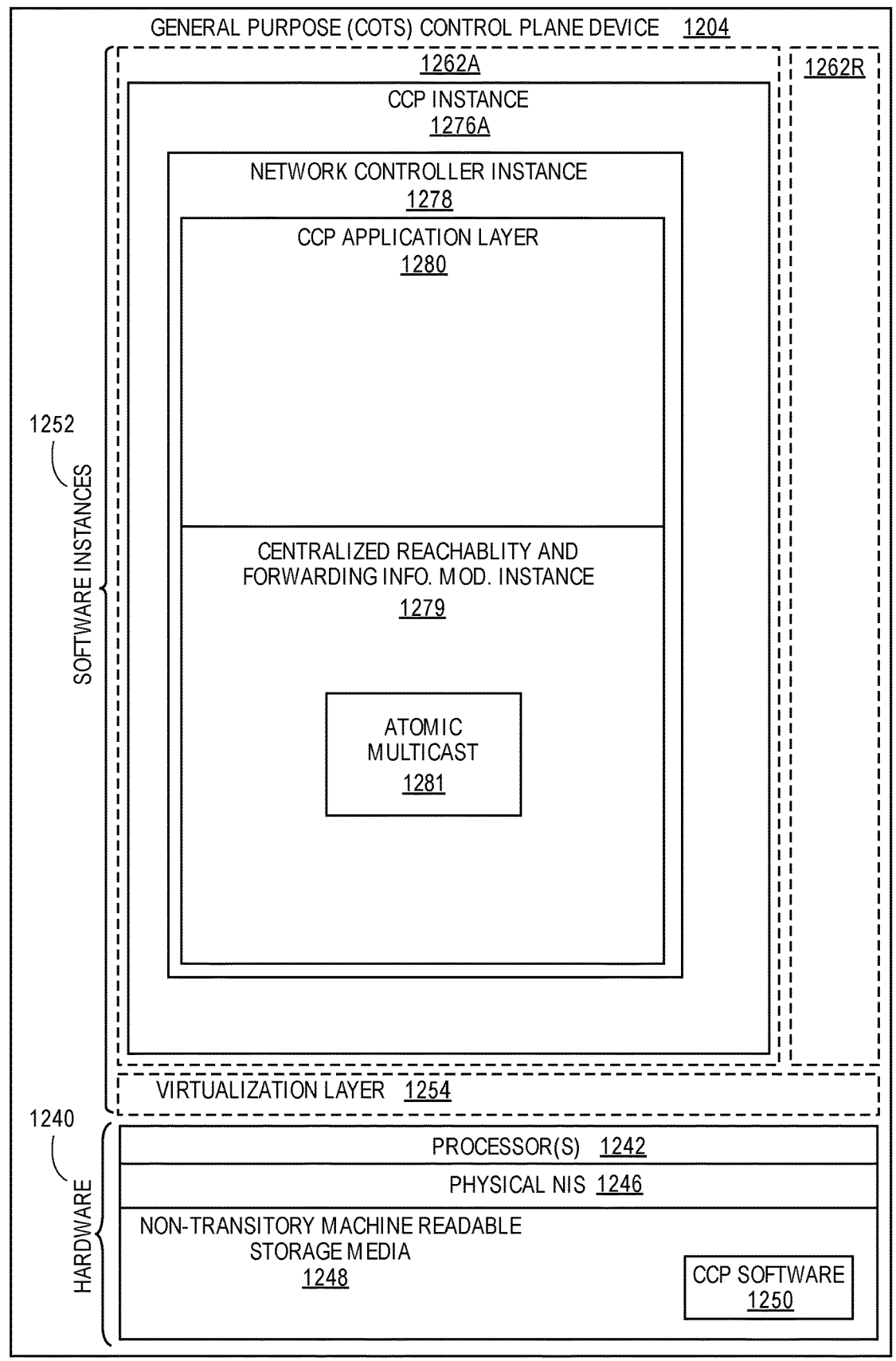
FIG. 12 illustrates a general-purpose control plane device with centralized control plane (CCP) software 1250), according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 12 illustrates, a general-purpose control plane device 1204 including hardware 1240 comprising a set of one or more processor(s) 1242 (which are often COTS processors) and physical NIs 1246, as well as non-transitory machine readable storage media 1248 having stored therein centralized control plane (CCP) software 1250.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user-interfaces). At a more abstract level, this CCP application layer 1280 within the centralized control plane 1176 works with virtual network view(s) (logical view(s) of the network) and the middleware layer provides the conversion from the virtual networks to the physical view. The networking controller instance 1278 can include atomic multicast 1281 support as described herein. In other embodiments, the atomic multicast 1281 functions are implemented in other components of the network device 1102 as a program instance and/or as distributed functions.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

Additional Example Embodiment(s)

Figure 13:
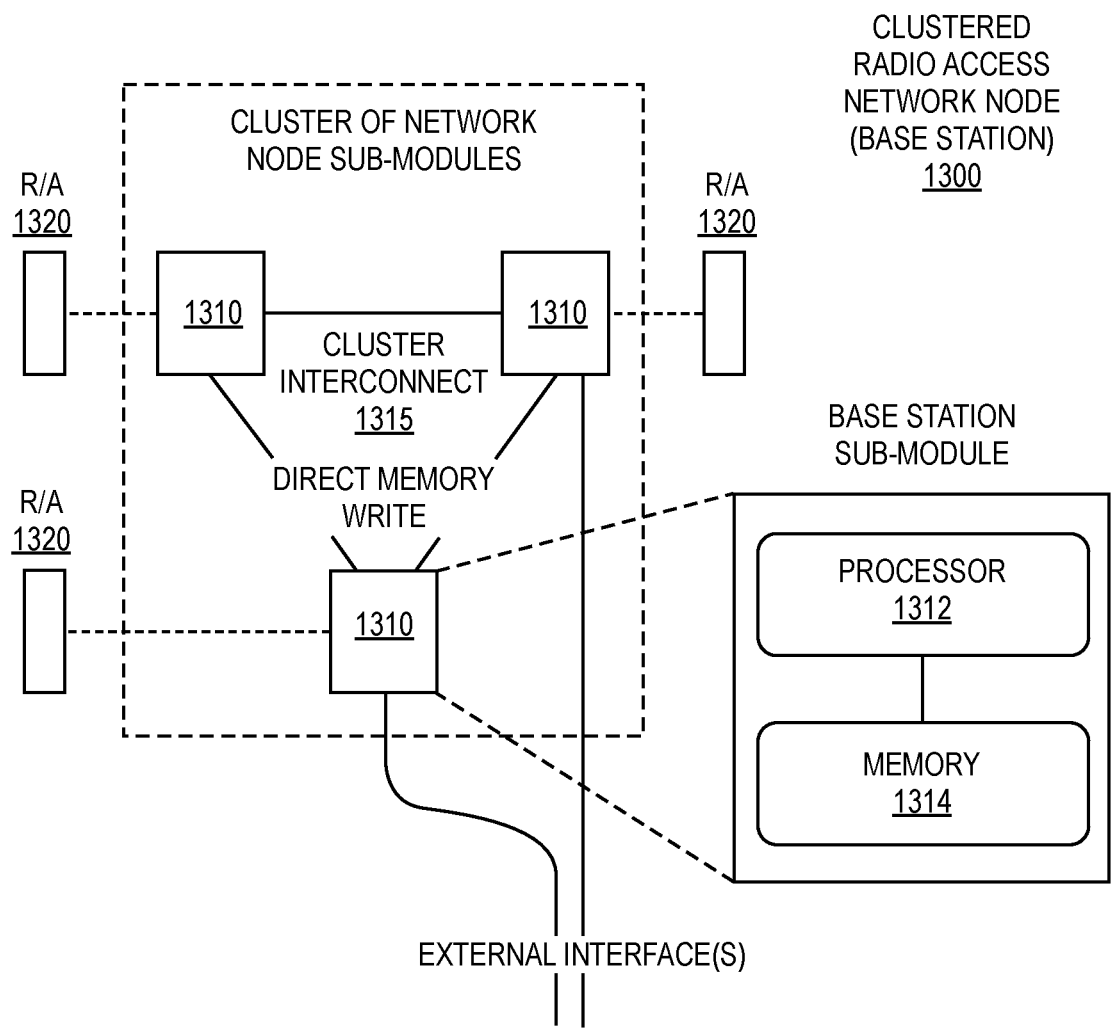
FIG. 13 is a schematic diagram illustrating an example of a clustered radio access network node according to an embodiment.

FIG. 13 is a schematic diagram illustrating an example of a clustered radio access network node according to an embodiment. The radio access network node 1300 is configured to be implemented as a clustered system comprising a cluster of at least two interconnected network node sub-modules 1310, each of which comprises a processing unit such as a processor 1312 and memory 1314, and the memory 1314 comprises a data structure. At least one of the network node sub-modules 1310 is configured to manage at least one radio and/or antenna (R/A) unit 1320. The radio access network node 1300 has a communication mechanism, also referred to as a cluster interconnect 1315, for communication between the network node sub-modules 1310, and the communication mechanism is configured to enable a direct memory write operation from at least one network node sub-module 1310 into the data structure of at least one other network node sub-module 1310.

In this way, a highly effective clustered radio access network node such as a base station can be provided for a wireless communication system. The embodiments enable high performance, low latency communication between network node sub-modules in the cluster of interconnected network node sub-modules.

In other words, at least part of the radio access network node functionality may be configured to be distributed in the cluster of interconnected network node sub-modules.

The network node sub-modules may sometimes be referred to as sub-modules, and/or members and/or participants and/or units.

For example, the radio access network node may be a base station and the network node sub-modules may be base station sub-modules.

By way of example, the radio access network node 1300 may be configured to be implemented as a distributed application running on the cluster of interconnected network node sub-modules 1310. For example, cluster middleware can be used for implementing functions for supporting distribution of information, replicating data and keeping data consistency, achieving quorum, electing leaders and so forth. As an example, the distributed application may be an application configured to perform baseband processing, packet processing, and/or control processing for the radio access network node.

For example, at least one of the network node sub-modules 1310 may be configured to perform baseband processing, packet processing and/or control processing. The conventional baseband module may be replaced by one or more of the interconnected network node sub-modules.

It should also be understood that there may be additional network node sub-modules that may not be configured to manage any radio and/or antenna (R/A) unit, but may be customized for specific digital processing.

It should also be understood that the term radio and/or antenna unit may refer to radio units, antenna units and any combination thereof, including conventional radio and antenna units, remote radio heads and radio dots, as well as analog and/or digital radio parts. In this regard, it must also be understood that the network node sub-modules may include converter(s) for providing digital and/or analog output signals for the radio and/or antenna units, all depending on the desired choice of implementation.

One or more of the network node sub-modules may also be connected to external interfaces such as S1 and/or X2 interfaces.

As an example, at least one of the network node sub-modules 1310 may be configured to manage at least one cell within the wireless communication system.

In a particular example, the processing unit such as the processor 1312 of at least one of the network node sub-module 1310 is configured to perform a direct memory write operation (i.e., a remote write) to at least one other network node sub-module to support atomic multicast according to the embodiments described herein above.

Although the radio access network node may be configured as a distributed application running on a cluster of interconnected network node sub-modules, the actual physical organization of the sub-modules may be either centralized or distributed.

As an example, the cluster of interconnected network node sub-modules 1310 may be physically centralized in the same location. For example, the sub-modules may be located in the same cabinet or room.

Alternatively, the cluster of interconnected network node sub-modules 1310 may be physically distributed. For example, the radio and/or antenna units 1320 of the radio access network node 1300 may be distributed and each of at least a subset of the network node sub-modules 1310 may be integrated physically with the corresponding radio and/or antenna unit 1320.

By way of example, the network node sub-modules 1310 may be configured to communicate based on a cluster interconnect 1315 using direct links and/or indirect links between the network node sub-modules 1310.

In a particular example, the network node sub-modules 1310 are configured to communicate based on a cluster interconnect 1315 using a full mesh with direct links between the network node sub-modules 1310.

Alternatively, the network node sub-modules 1310 may be configured to communicate based on a cluster interconnect 1315 using a mesh with direct links and/or multi-hop links between the network node sub-modules 1310.

If desired, the cluster interconnect may be configured as a redundant interconnect with one or more reserve or alternative paths in order to be able to handle interconnection faults.

In another particular example, the network node sub-modules 1310 are configured to communicate based on a cluster interconnect 1315 using a switched network to interconnect the network node sub-modules 1310.

In a particular example, the cluster interconnect 1315 may be based on Peripheral Component Interconnect, PCI, and/or Ethernet technology.

Figure 14:
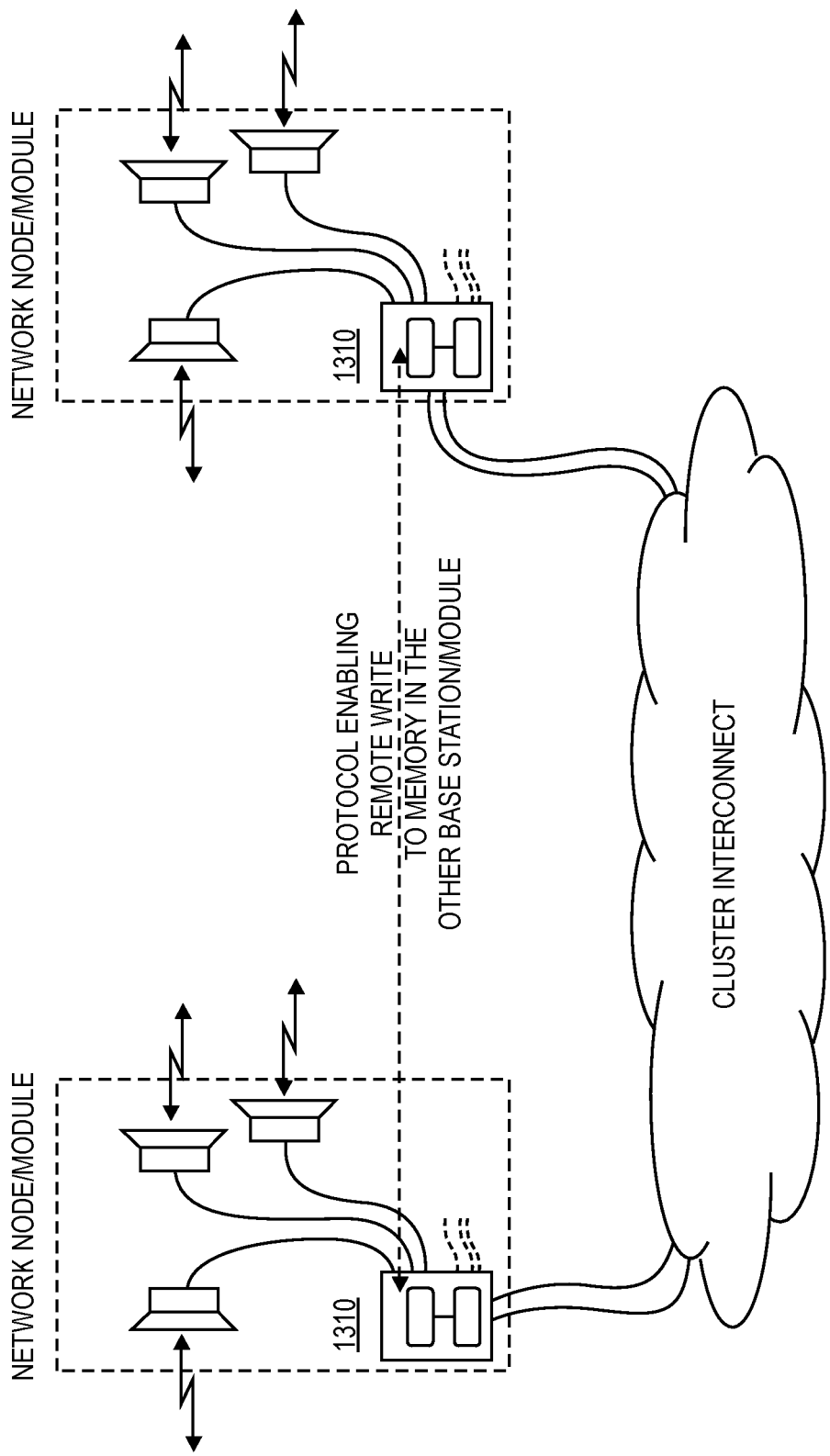
FIG. 14 is a schematic diagram illustrating an example of a cluster of radio access network nodes and/or network node sub-modules interconnected by means of a "cloud-based" cluster interconnect.

FIG. 14 is a schematic diagram illustrating an example of a cluster of radio access network nodes and/or network node sub-modules interconnected by means of a "cloud-based" cluster interconnect. The atomic multicast communication process described herein can be implemented in this context as well.

Figure 15:
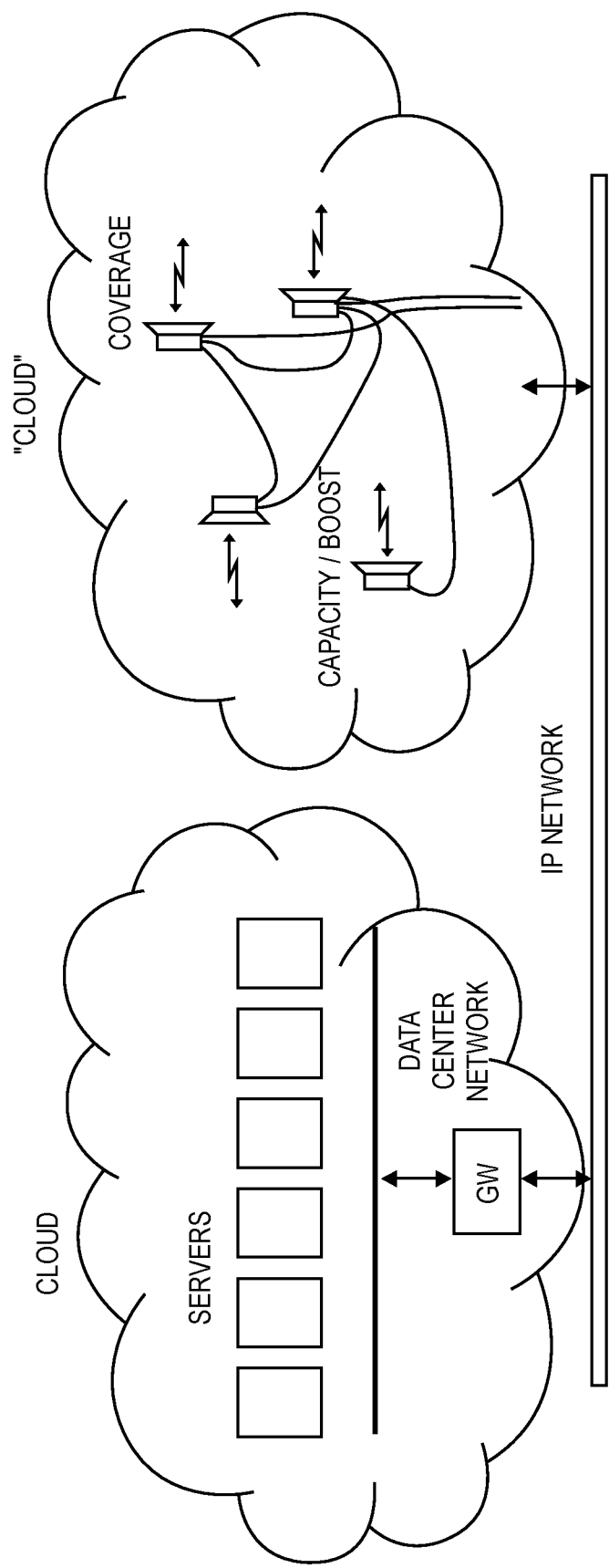
FIG. 15 is a schematic diagram illustrating a comparative example of an execution cloud and a radio protocol cloud.

FIG. 15 is a schematic diagram illustrating a comparative example of an execution cloud and a radio protocol cloud.

A current trend in Radio Access Network (RAN) development is to move functionality to datacenters in the cloud for achieving resilience, scalability, ease of maintenance and so forth. The key enabler for this is that the software is designed as a scalable distributed application.

The embodiments enable implementing scalable and distributed applications also near the radio, potentially enabling a similar cloud view also locally in the low latency radio protocol part of the system. For latency reasons, this execution can be physically near the radio antennas. In some embodiments these are integrated as one physical unit.

By having a distributed application also at the real-time execution in the radio access network node, it is possible to reuse mechanisms from the cloud for software maintenance and lifecycle issues, giving the same manageability. Also, a so-called local cloud view in the radio access network node with distributed independent sub-modules that can fail or restart without bringing the whole radio access network node down will also support a higher availability.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
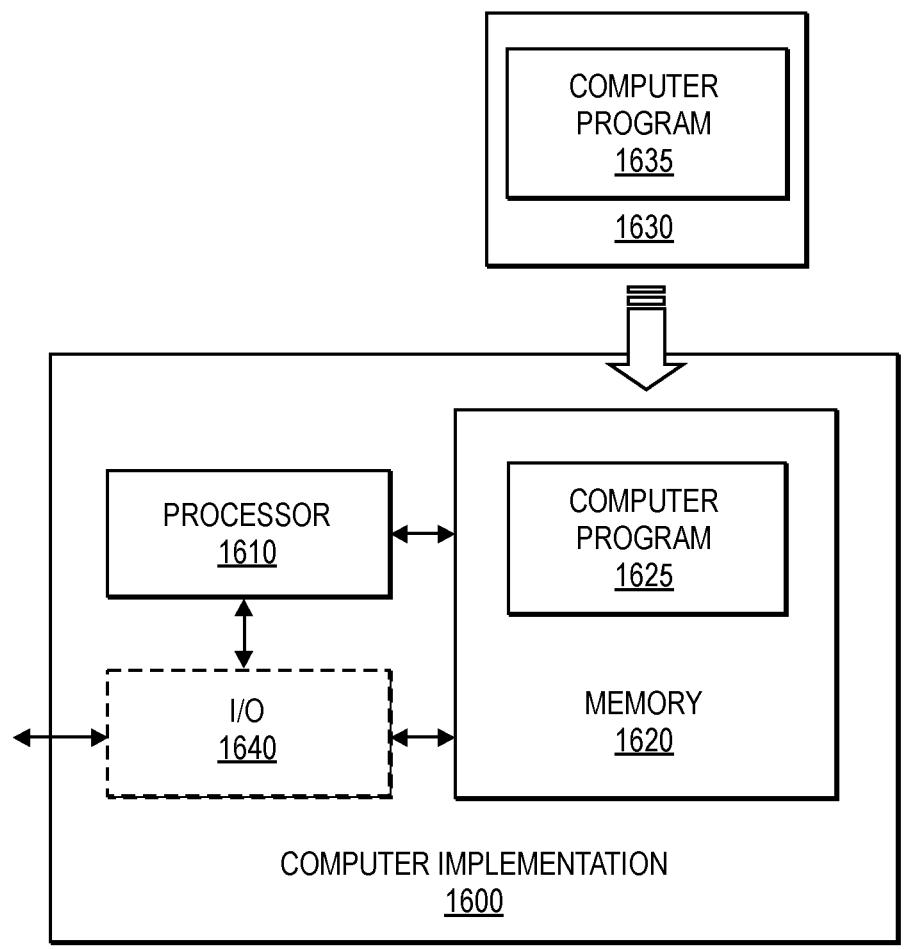
FIG. 16 is a schematic diagram illustrating an example of a computer implementation according to an embodiment.

FIG. 16 is a schematic diagram illustrating an example of a computer implementation 1600 according to an embodiment. In this particular example, at least some of the steps, functions, procedures, modules and/or blocks described herein are implemented in a computer program 1625, 1635, which is loaded into the memory 1620 for execution by processing circuitry including one or more processors 1610. The processor(s) 1610 and memory 1620 are interconnected to each other to enable normal software execution. An optional input/output device 1640 may also be interconnected to the processor(s) 1610 and/or the memory 1620 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' can be interpreted in a general sense as any system or device capable of executing program code or computer program instructions to perform a particular processing, determining or computing task.

The processing circuitry including one or more processors 1610 is thus configured to perform, when executing the computer program 1625, well-defined processing tasks such as those described herein.

In a particular aspect, there is provided a computer program 1625, 1635 for operating, when executed, a radio access network node for a wireless communication system. The radio access network node is implemented as a clustered system comprising a cluster of at least two interconnected network node sub-modules. The computer program 1625, 1635 comprises instructions, which when executed by at least one processor, cause the at least one processor to: enable at least one of the network node sub-modules to manage at least one radio and/or antenna unit, and enable at least one of the network node sub-modules to perform a direct memory write operation into a data structure of at least one other network node sub-module.

By way of example, the computer program 1625, 1635 may be implemented as a distributed application for execution on the cluster of interconnected network node sub-modules.

In another particular aspect, there is provided a computer program 1625, 1635 for operating, when executed, a network node sub-module of a clustered radio access network node comprising a cluster of at least two interconnected network node sub-modules. The computer program 1625, 1635 comprises instructions, which when executed by at least one processor 1610, cause the at least one processor to: enable the network node sub-module to manage at least one radio and/or antenna unit, and enable the network node sub-module to perform a direct memory write operation into a data structure of at least one other network node sub-module.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 1625, 1635 may be realized as a computer program product, which is normally carried or stored on a computer-readable medium 1620, 1630, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
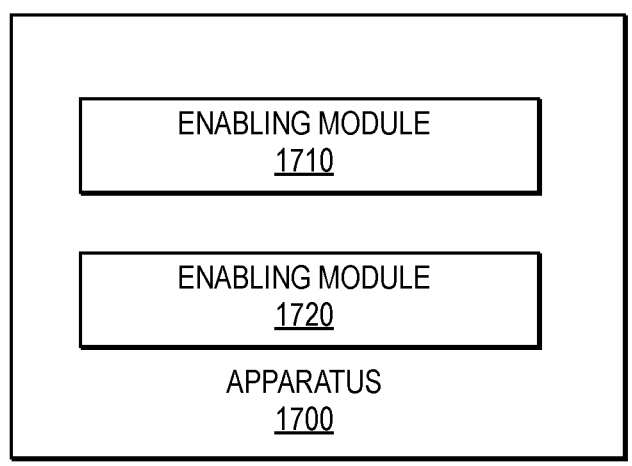
FIG. 17 is a schematic diagram illustrating an example of an apparatus for operating, when executed, a radio access network node and/or a network node sub-module for a wireless communication system.

FIG. 17 is a schematic diagram illustrating an example of an apparatus for operating, when executed, a radio access network node for a wireless communication system. The radio access network node is implemented as a clustered system comprising a cluster of at least two interconnected network node sub-modules. The apparatus 1700 comprises: a module 1710 for enabling at least one of the network node sub-modules to manage at least one radio and/or antenna unit, and a module 1720 for enabling at least one of the network node sub-modules to perform a direct memory write operation into a data structure of at least one other network node sub-module.

With reference once again to FIG. 17, there is also provided an apparatus for operating, when executed, a network node sub-module of a clustered radio access network node comprising a cluster of at least two interconnected network node sub-modules. The apparatus 1700 comprises: a module 1710 for enabling the network node sub-module to manage at least one radio and/or antenna unit, and a module 1720 for enabling the network node sub-module to perform a direct memory write operation into a data structure of at least one other network node sub-module.

Alternatively, it is possible to realize the module(s) in FIG. 17 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 18:
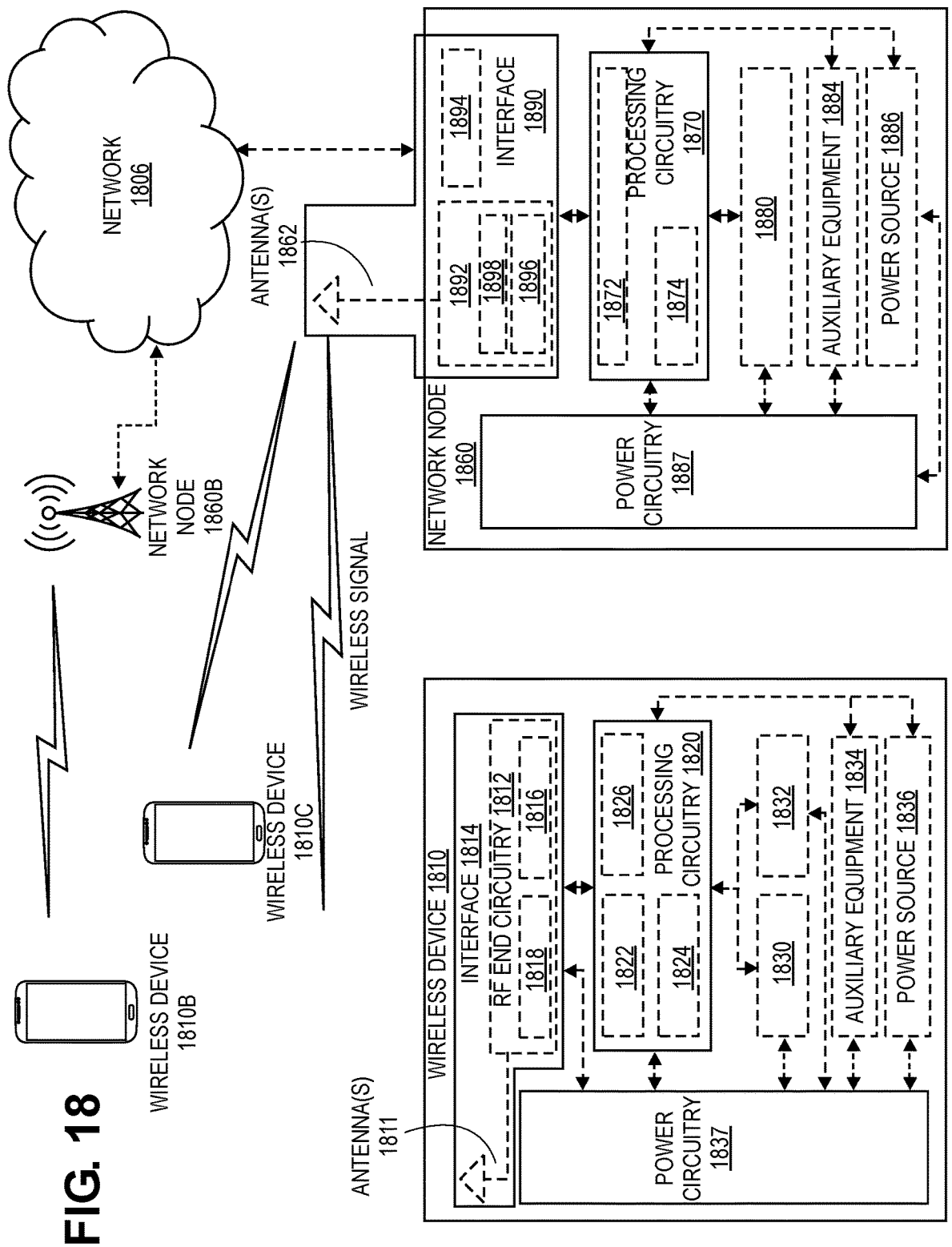
FIG. 18 is a schematic diagram illustrating an example of a wireless network in accordance with some embodiments.

By way of example, the "virtual" apparatus may be implemented in a wireless device or network node (e.g., wireless device 1810 or network node 1860 shown in FIG. 18). The apparatus is operable to carry out the example method(s) described herein, and possibly any other processes or methods disclosed herein. It is also to be understood that at least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of: 1) Consolidation of network functionality into virtualized software running on customized or generic hardware. This is sometimes referred to as network function virtualization. 2) Co-location of one or more application stacks, including operating system, running on separate hardware onto a single hardware platform. This is sometimes referred to as system virtualization, or platform virtualization. 3) Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to provide high performance radio access network nodes such as base stations.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 14-17.

FIG. 18 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860B, and wireless devices 1810, 1810B, and 1810C. In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node

1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units.

In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
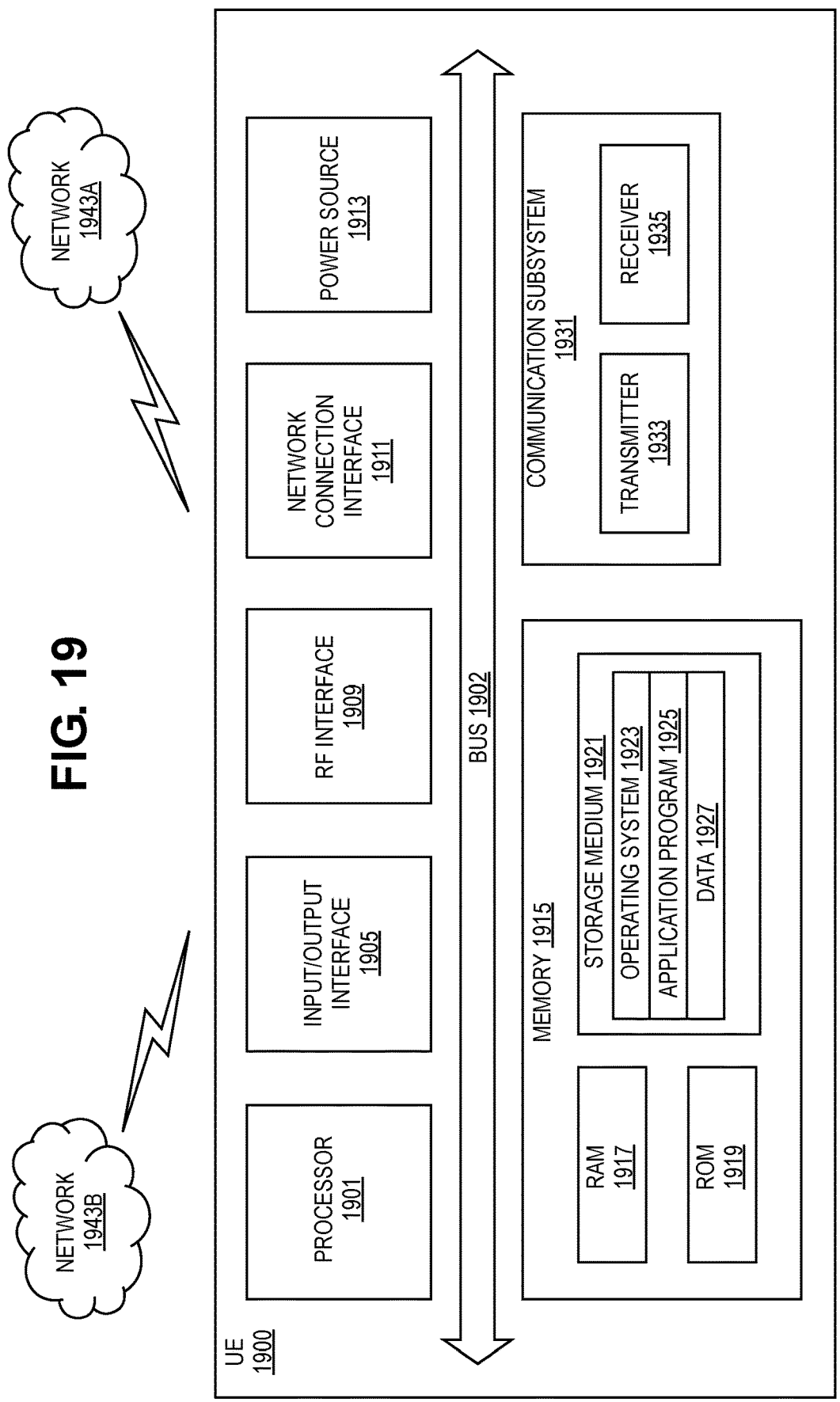
FIG. 19 is a schematic diagram illustrating an example of an embodiment of a UE in accordance with various aspects described herein.

FIG. 19 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processor 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1913, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processor 1901 may be configured to process computer instructions and data. Processor 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processor 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943A. Network 1943A may encompass wired and/or wireless networks such as a local-area network (LAN), a wide-area network (WAN), a computer network, a wireless network, a telecommunications network, another like network or any combination thereof. For example, network 1943A may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processor 1901 to provide storage or caching of data or computer instructions during the execution of software programs such as the operating system, application programs, and device drivers. ROM 1919 may be configured to provide computer instructions or data to processor 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processor 1901 may be configured to communicate with network 1943B using communication subsystem 1931. Network 1943A and network 1943B may be the same network or networks or different network or networks. Communication subsystem 1931 may be configured to include one or more transceivers used to communicate with network 1943B. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMAX, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943B may encompass wired and/or wireless networks such as a local-area network (LAN), a wide-area network (WAN), a computer network, a wireless network, a telecommunications network, another like network or any combination thereof. For example, network 1943B may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processor 1901 may be configured to communicate with any of such components over bus 1902. In another example, any of such components may be represented by program instructions stored in memory that when executed by processor 1901 perform the corresponding functions described herein. In another example, the functionality of any of such components may be partitioned between processor 1901 and communication subsystem 1931. In another example, the non-computationally intensive functions of any of such components may be implemented in software or firmware and the computationally intensive functions may be implemented in hardware.

Figure 20:
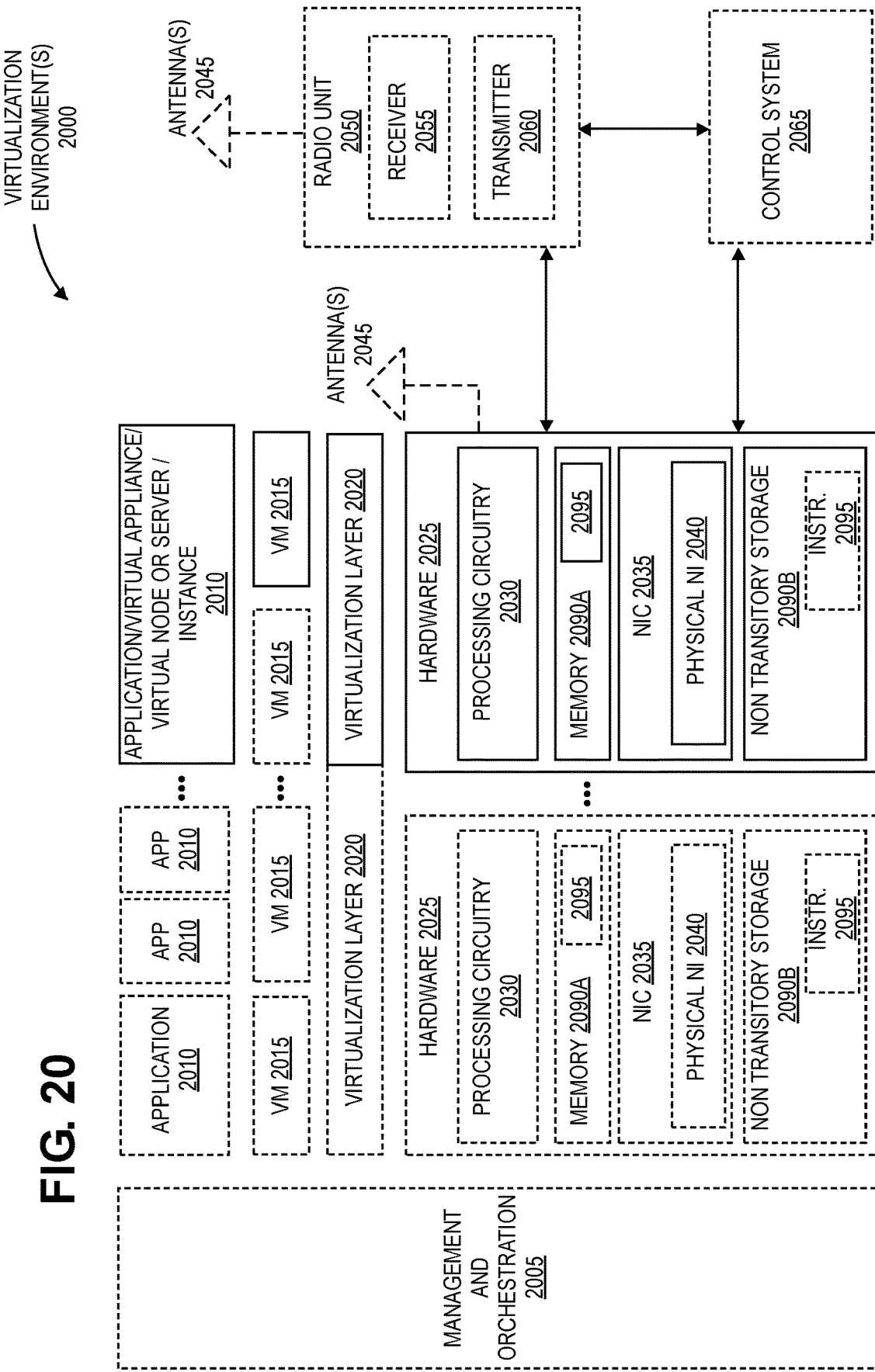
FIG. 20 is a schematic block diagram illustrating an example of a virtualization environment in which functions implemented by some embodiments may be virtualized.

FIG. 20 is a schematic block diagram illustrating an example of a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware 2025. Further, in embodiments in which the virtual node is not a radio access node or does not require radio connectivity (e.g., a core network node), then the network node may be entirely virtualized.

The functions may be implemented by one or more applications 2010 (which may alternatively be called software instances, virtual appliances, network functions, virtual nodes, virtual network functions, etc.) operative to implement some of the features, functions, and/or benefits of some of the embodiments disclosed herein. Applications 2010 are run in virtualization environment 2000 which provides hardware 2025 comprising processing circuitry 2030 and memory 2090A. Memory 2090A contains instructions 2095 executable by processing circuitry 2030 whereby application 2010 is operative to provide one or more of the features, benefits, and/or functions disclosed herein.

Virtualization environment 2000 comprises hardware 2025 comprising a set of one or more processors or processing circuitry 2030, which may be commercial off-the-shelf (COTS) processors, dedicated Application Specific Integrated Circuits (ASICs), or any other type of processing circuitry including digital or analog hardware components or special purpose processors. Each hardware device may comprise memory 2090A which may be non-persistent memory for temporarily storing instructions 2095 or software executed by processing circuitry 2030. Each hardware device may comprise one or more network interface controllers (NICs) 2035, also known as network interface cards, which include physical network interface 2040. Each hardware device may also include non-transitory, persistent, machine-readable storage media 2090B having stored therein software 2095 and/or instructions executable by processing circuitry 2030. Software 2095 may include any type of software including software for instantiating one or more virtualization layers 2020 (also referred to as hypervisors), software to execute virtual machines 2015 as well as software allowing it to execute functions, features and/or benefits described in relation with some embodiments described herein.

Virtual machines 2015, comprise virtual processing, virtual memory, virtual networking or interface and virtual storage, and may be run by a corresponding virtualization layer 2020 or hypervisor. Different embodiments of the instance of virtual appliance 2010 may be implemented on one or more of virtual machines 2015, and the implementations may be made in different ways.

During operation, processing circuitry 2030 executes software 2095 to instantiate the hypervisor or virtualization layer 2020, which may sometimes be referred to as a virtual machine monitor (VMM). Virtualization layer 2020 may present a virtual operating platform that appears like networking hardware to virtual machine 2015.

As shown in FIG. 20, hardware 2025 may be a standalone network node with generic or specific components. Hardware 2025 may comprise antenna 2045 and may implement some functions via virtualization. Alternatively, hardware 2025 may be part of a larger cluster of hardware (e.g. such as in a data center or customer premise equipment (CPE)) where many hardware nodes work together and are managed via management and orchestration (MANO) 2005, which, among others, oversees lifecycle management of applications 2010.

In some embodiments, virtualization of the hardware is in some contexts referred to as NFV. NFV may be used to consolidate many network equipment types onto industry standard high volume server hardware, physical switches, and physical storage, which can be located in data centers, and customer premise equipment. However, NFV is not limited to this usage and can be applied to any function virtualization.

In one example of NFV, virtual machine 2015 may be a software implementation of a physical machine that runs programs as if they were executing on a physical, non-virtualized machine. Each of virtual machines 2015, and that part of hardware 2025 that executes that virtual machine, be it hardware dedicated to that virtual machine and/or hardware shared by that virtual machine with others of the virtual machines 2015, forms a separate virtual network elements (VNE).

Still in the context of NFV, Virtual Network Function (VNF) is responsible for handling specific network functions that run in one or more virtual machines 2015 on top of hardware 2025 and corresponds to application 2010 in FIG. 20.

In some embodiments, one or more radio units 2050 that each include one or more transmitters 2060 and one or more receivers 2055 may be coupled to one or more antennas 2045. Radio units 2050 may communicate directly with hardware 2025 via one or more appropriate network interfaces and may be used in combination with the virtual components to provide a virtual node with radio capabilities, such as a radio access node or a base station.

In some embodiments, some signalling can be effected with the use of control system 2065 which may alternatively be used for communication between the hardware 2025 and radio units 2050.

Figure 21:
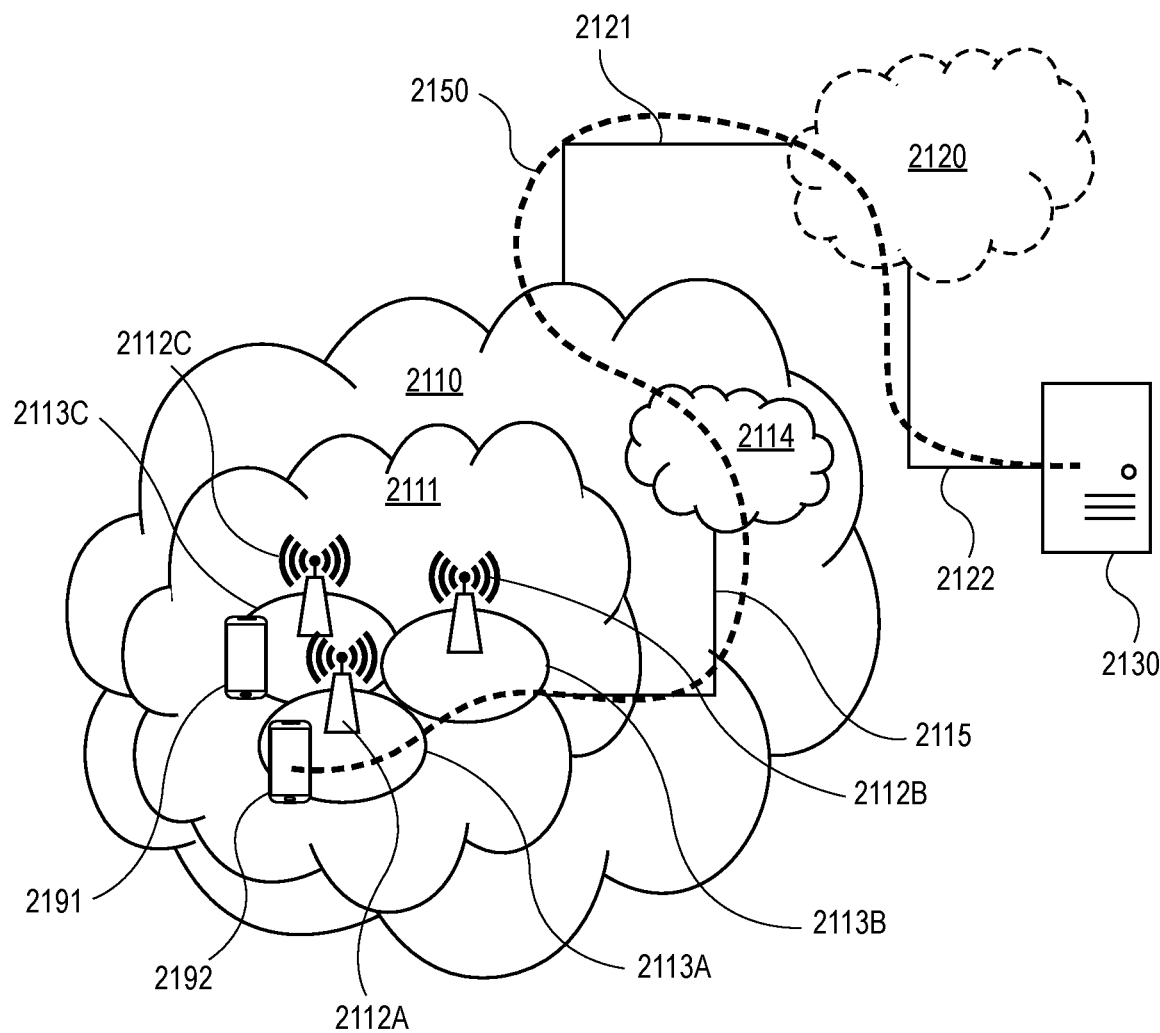
FIG. 21 is a schematic diagram illustrating an example of a telecommunication network connected via an intermediate network to a host computer in accordance with some embodiments.

FIG. 21 is a schematic diagram illustrating an example of a telecommunication network connected via an intermediate network to a host computer in accordance with some embodiments.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112A, 2112B, 2112C, such as NBs, eNBs, gNBs or other types of wireless access points, each defining a corresponding coverage area 2113A-C. Each base station 2112A, 2112B, 2112C is connectable to core network 2114 over a wired or wireless connection 2115. A first UE 2191 located in coverage area 2113C is configured to wirelessly connect to, or be paged by, the corresponding base station 2112C. A second UE 2192 in coverage area 2113A is wirelessly connectable to the corresponding base station 2112A. While a plurality of UEs 2191, 2192 are illustrated in this example, the disclosed embodiments are equally applicable to a situation where a sole UE is in the coverage area or where a sole UE is connecting to the corresponding base station 2112A-C.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112A-C may not or need not be informed about the past routing of an incoming downlink communication with data originating from host computer 2130 to be forwarded (e.g., handed over) to a connected UE 2191. Similarly, base station 2112A-C need not be aware of the future routing of an outgoing uplink communication originating from the UE 2191 towards the host computer 2130.

Figure 22:
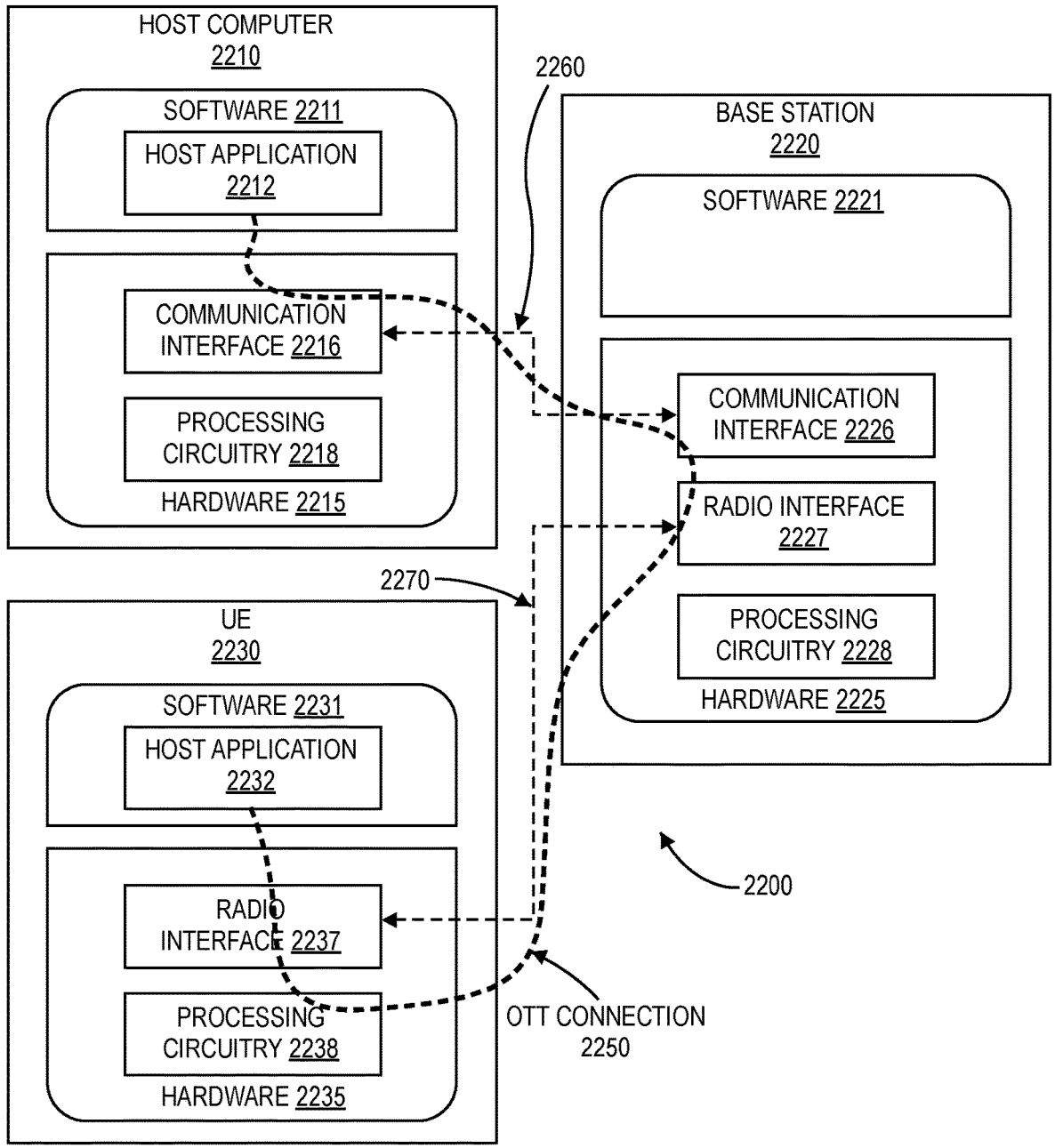
FIG. 22 is a schematic diagram illustrating an example of a host computer communicating via a base station with a user equipment over a partially wireless connection in accordance with some embodiments.

FIG. 22 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. The hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112A-C and one of UEs 2191, 2192 of FIG. 21, respectively. This is to say, the inner workings of these entities may be as shown in FIG. 22 and independently, the surrounding network topology may be that of FIG. 22.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer's 2210 measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figures 23A, 23B:
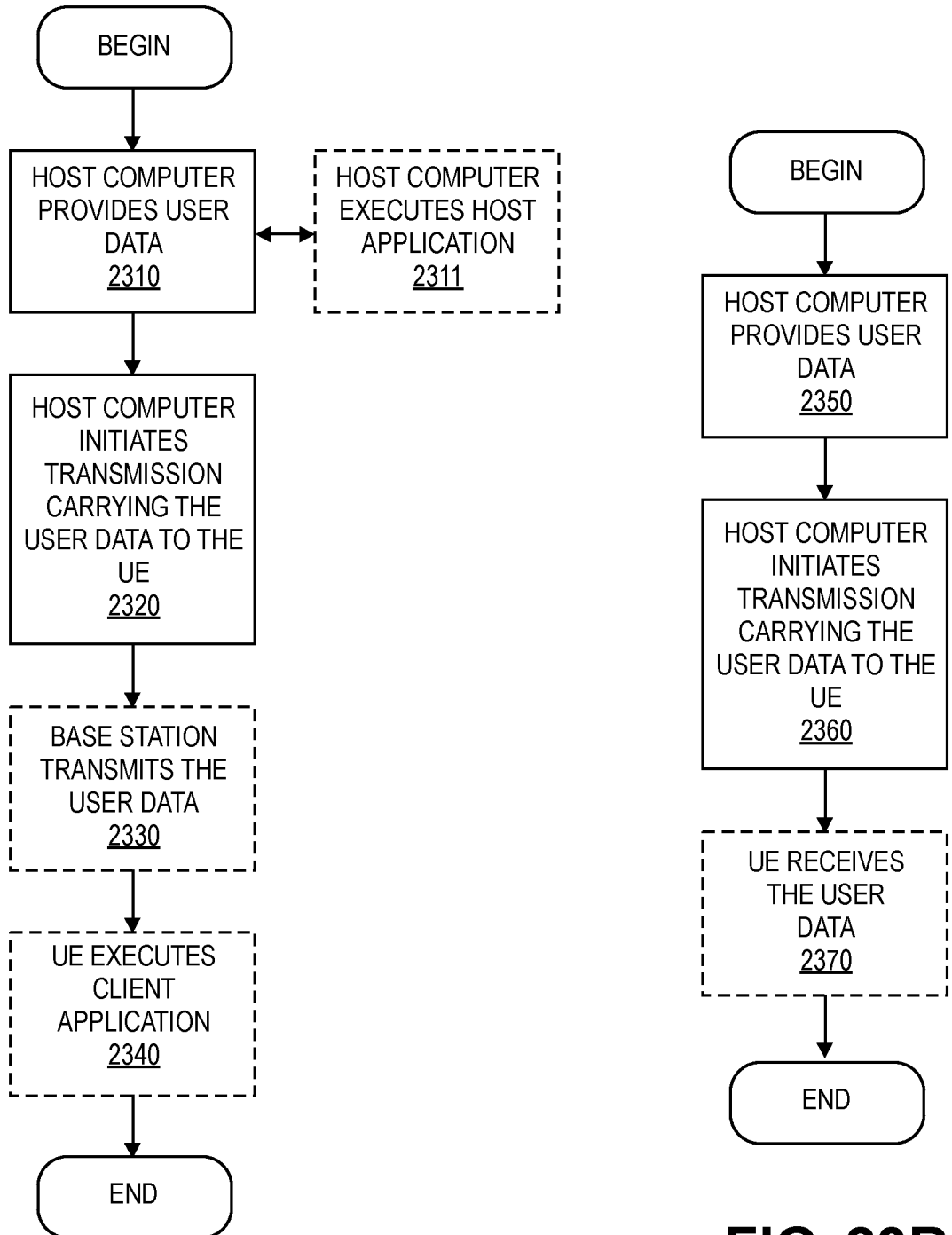
FIGS. 23A-B are schematic flow diagrams illustrating examples of methods implemented in a communication system including, e.g. a host computer, and optionally also a base station and a user equipment in accordance with some embodiments.

FIGS. 23A-B are schematic flow diagrams illustrating examples of methods implemented in a communication system including, e.g. a host computer, and optionally also a base station and a user equipment in accordance with some embodiments.

FIG. 23A is a flowchart illustrating a method implemented in a communication system, in accordance with one embodiment. The communication system includes a host computer, a base station and a UE which may be those described with reference to FIG. 21 and FIG. 22. For simplicity of the present disclosure, only drawing references to FIG. 23A will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

FIG. 23B is a flowchart illustrating a method implemented in a communication system, in accordance with one embodiment. The communication system includes a host computer, a base station and a UE which may be those described with reference to FIG. 21 and FIG. 22. For simplicity of the present disclosure, only drawing references to FIG. 23B will be included in this section. In step 2350 of the method, the host computer provides user data. In an optional substep (not shown) the host computer provides the user data by executing a host application. In step 2360, the host computer initiates a transmission carrying the user data to the UE. The transmission may pass via the base station, in accordance with the teachings of the embodiments described throughout this disclosure. In step 2370 (which may be optional), the UE receives the user data carried in the transmission.

Figures 24A, 24B:
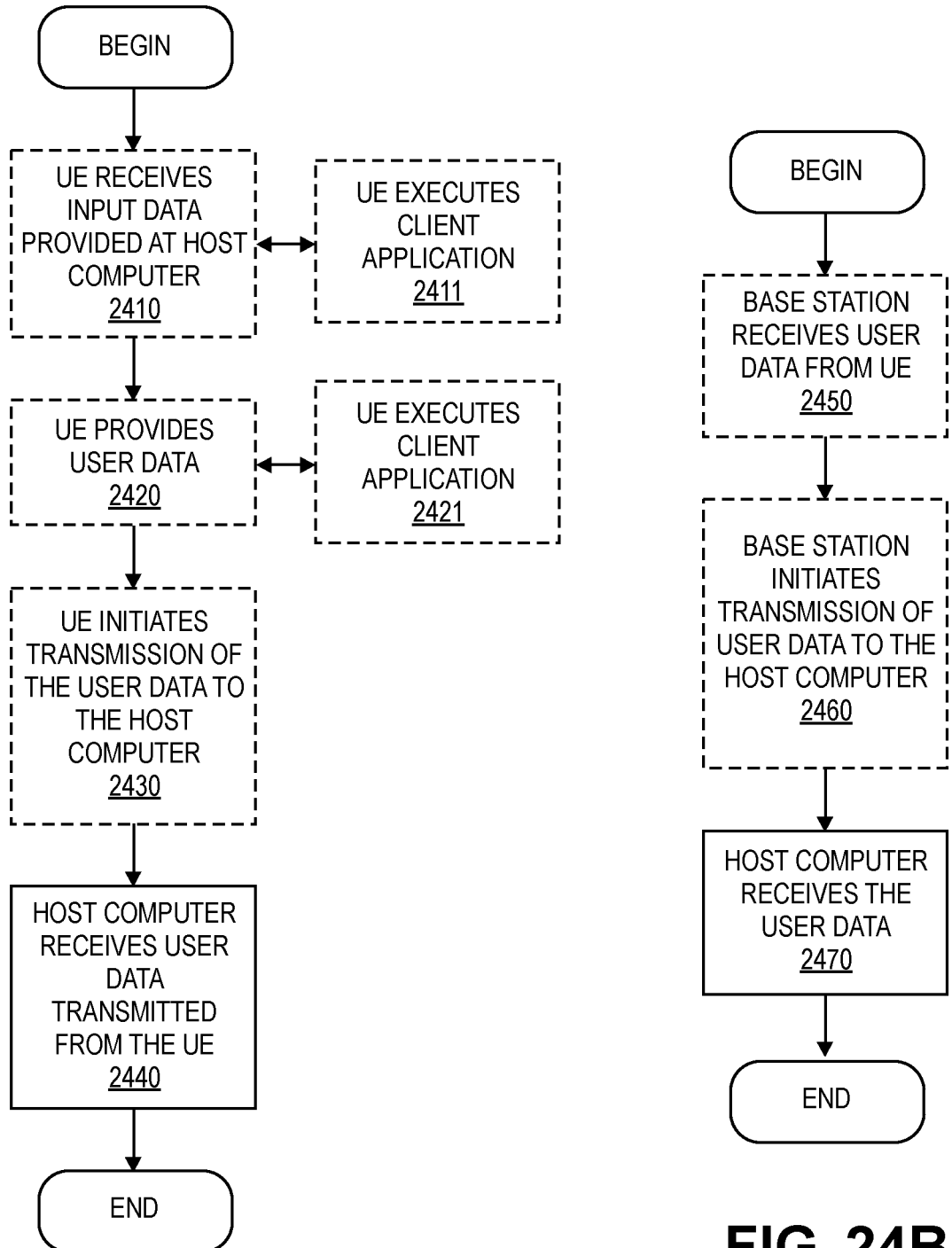
FIGS. 24A-B are schematic diagrams illustrating examples of methods implemented in a communication system including a host computer, a base station and a user equipment in accordance with some embodiments.

FIGS. 24A-B are schematic diagrams illustrating examples of methods implemented in a communication system including a host computer, a base station and a user equipment in accordance with some embodiments.

FIG. 24A is a flowchart illustrating a method implemented in a communication system, in accordance with one embodiment. The communication system includes a host computer, a base station and a UE which may be those described with reference to FIG. 21 and FIG. 22. For simplicity of the present disclosure, only drawing references to FIG. 24A will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

FIG. 24B is a flowchart illustrating a method implemented in a communication system, in accordance with one embodiment. The communication system includes a host computer, a base station and a UE which may be those described with reference to FIG. 21 and FIG. 22. For simplicity of the present disclosure, only drawing references to FIG. 33B will be included in this section. In step 2450 (which may be optional), in accordance with the teachings of the embodiments described throughout this disclosure, the base station receives user data from the UE. In step 2460 (which may be optional), the base station initiates transmission of the received user data to the host computer. In step 2470 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises: obtaining user data; and forwarding the user data to a host computer or a wireless device.

There is also provided a network node such as a base station comprising processing circuitry configured to perform any of the steps of the method described herein.

There is further provided a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

While embodiments of the invention have been described in relation to atomic multicast, other embodiments are possible where similar processes are utilized. In particular, any process where data is to be disseminated in an ordered fashion to a discrete group can utilize the principles and structures described herein Therefore, embodiments of the invention are not limited to atomic multicast. In addition, while embodiments of the invention have been described in relation to atomic multicast, alternative embodiments could be implemented such that an ordered dissemination of information via remote writes is possible. Such an embodiment could be implemented by having the same sender, receiver, and sequencer functions distributed over multiple computing devices.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a computing device for atomic multicast support for a multicast group, the method comprising:
    polling an activation vector that contains a respective vector entry for senders in the multicast group to identify at least one sender sending an atomic multicast message;
    receiving a message order from a sequencer, the message order defining a sequence for a plurality of messages from the multicast group;
    receiving the plurality of messages from the at least one sender in the multicast group via remote write; and
    providing the plurality of messages to an application in the message order, in response to determining that all of the plurality of messages have been received.

2. The method of claim 1, further comprising:
    requesting resending of a message from the plurality of messages, in response to determining that the message was not received in a defined time frame.

3. The method of claim 1, wherein the message order is received as an ordering log having a tuple format including a sender and a sequence number.

4. The method of claim 3, further comprising:
    polling the ordering log to detect updates; and
    polling for receipt of the plurality of messages, in response to detecting an update to the ordering log.

5. The method of claim 1, further comprising:
    sending an acknowledgement to a sender in the multicast group for any one of a receipt of the message order and a message from the sender identified in the message order.

6. An electronic device comprising:
    a non-transitory computer readable medium having stored therein code for atomic multicast support for a multicast group; and
    a processor coupled to the non-transitory computer readable medium, the processor to execute the code to cause the electronic device to:
        poll an activation vector that contains a respective vector entry for senders in the multicast group to identify at least one sender sending an atomic multicast message;
        receive a message order from a sequencer, the message order defining a sequence for a plurality of messages from the multicast group;
        receive the plurality of messages from the at least one sender in the multicast group via remote write; and
        provide the plurality of messages to an application in the message order, in response to determining that all of the plurality of messages have been received.

7. The electronic device of claim 6, wherein the electronic device is configured to execute a plurality of virtual machines, the plurality of virtual machines implementing network function virtualization (NFV).

8. The electronic device of claim 6, wherein the electronic device is a control plane device configured to implement a control plane of a software defined networking (SDN).

9. The electronic device of claim 6, wherein the electronic device is a base station configured to operate in a radio access network.

10. A non-transitory machine-readable storage medium comprising computer program code which when executed by a computer causes atomic multicast support for a multicast group by performing operations comprising:
    polling an activation vector that contains a respective vector entry for senders in the multicast group to identify at least one sender sending an atomic multicast message;
    receiving a message order from a sequencer, the message order defining a sequence for a plurality of messages from the multicast group;
    receiving the plurality of messages from the at least one sender in the multicast group via remote write; and providing the plurality of messages to an application in the message order, in response to determining that all of the plurality of messages have been received.

11. The non-transitory machine-readable storage medium of claim 10, wherein the computer program code further performs operations comprising:
  requesting resending of a message from the plurality of messages, in response to determining that the message was not received in a defined time frame.

12. The non-transitory machine-readable storage medium of claim 10, wherein the message order is received as an ordering log having a tuple format including a sender and a sequence number.

13. The non-transitory machine-readable storage medium of claim 12, wherein the computer program code further performs operations comprising:
  polling the ordering log to detect updates; and
  polling for receipt of the plurality of messages, in response to detecting an update to the ordering log.

14. The non-transitory machine-readable storage medium of claim 10, wherein the computer program code further performs operations comprising:
  sending an acknowledgement to a sender in the multicast group for any one of a receipt of the message order and a message from the sender identified in the message order.

15. The electronic device of claim 6, further to request resending of a message from the plurality of messages, in response to a determination that the message was not received in a defined time frame.

16. The electronic device of claim 6, wherein the message order is received as an ordering log having a tuple format including a sender and a sequence number.

17. The electronic device of claim 16, further to:
  poll the ordering log to detect updates; and
  poll for receipt of the plurality of messages, in response to a detection of an update to the ordering log.

18. The electronic device of claim 6, further to send an acknowledgement to a sender in the multicast group for any one of a receipt of the message order and a message from the sender identified in the message order.

* * * * *